United States Patent [19]

Seng et al.

[11] 4,248,615
[45] Feb. 3, 1981

[54] POLLUTION ABATING, ENERGY CONSERVING GLASS MANUFACTURING PROCESS

[75] Inventors: Stephen Seng, Frazeysburg; Richard K. Henry, Newark; Mark A. Propster, Gahanna; Charles M. Hohman, Granville, all of Ohio

[73] Assignee: Owens-Corning Fiberglas Corporation, Toledo, Ohio

[21] Appl. No.: 95,870

[22] Filed: Nov. 19, 1979

Related U.S. Application Data

[63] Continuation-in-part of Ser. No. 31,368, Apr. 19, 1979, abandoned.

[51] Int. Cl.³ .............................................. C03B 3/00
[52] U.S. Cl. ........................................ 65/27; 65/134; 65/335; 55/99; 55/390; 106/52; 106/DIG. 8; 264/117
[58] Field of Search ...................... 65/27, 134, 335; 106/DIG. 8, 52; 264/117; 55/99, 390

[56] References Cited

U.S. PATENT DOCUMENTS

| Re. 29,622 | 5/1978  | Lange .............................. 65/27       |
|------------|---------|--------------------------------------------------|
| 2,220,750  | 11/1940 | Blair .............................. 106/52 X    |
| 2,366,473  | 1/1945  | Blair .............................. 106/52      |
| 2,597,640  | 5/1952  | Howard .............................. 65/335     |
| 3,542,534  | 11/1970 | Yamamoto .............................. 65/27    |
| 3,726,697  | 9/1979  | Mod et al. .......................... 264/117 X  |
| 3,728,094  | 4/1973  | Bowman .............................. 65/27      |
| 3,767,751  | 10/1973 | Simmingskold et al. ............... 264/117      |
| 3,788,832  | 1/1974  | Nesbitt et al. ......................... 65/134  |
| 3,880,639  | 4/1975  | Bodner et al. ......................... 65/134   |
| 4,023,976  | 5/1977  | Bauer et al. .......................... 106/52   |
| 4,026,691  | 5/1977  | Lovett et al. .......................... 65/27   |
| 4,031,175  | 6/1977  | Cooper et al. ........................ 264/117 X |
| 4,113,459  | 9/1978  | Mattmuller .......................... 65/135     |
| 4,184,861  | 1/1980  | Erickson et al. ....................... 65/27    |

FOREIGN PATENT DOCUMENTS

862535 12/1977 Belgium.
672598 5/1934 Fed. Rep. of Germany .............. 259/4

OTHER PUBLICATIONS

"Moglichkeiten der Industrellen Pelletierung von Glassemengen,"Glastechnische Berighte, 50(1): 19-23 (1977), B. Mueller.
Glass, Feb. 1965, pp. 68, 69.
British Glass Industry Research Assn. "Pelletization of Glass Batch" by G. Higginbotham, Dec. 1977.
Glastechnisk Tidskrift 25 (1970): 4, pp. 83, 84.
Agglomeration in the Glass Industry-An Energy and Environmental Tool, Part 1, W. H. Engelleitner, Glass, Dec. 1978, p. 564.
"Seminar on the Exciting Prospects of Glass Batch Briquetting", American Glass Review, Nov. 1977, pp. 6,7,8.
"Batch Pelletizing and Preheating, "The Glass Industry", Jul. 1979, by Bansal et al., pp. 12, 13, 14, 15, 26, 29.
"Pilot Plant Test Program for Glass Batch Briquetting, Prereacting and Melting", Colorado School of Mines Research Inst., Project A50829 9/23/1977.
39th Annual Conference on Glass Problems, Nov. 15, 16, 1978, Dept. of Ceramic Engineering, Ohio State University, Columbus, Ohio, EPA Batch Pretreatment Project, by Boettner et al., Corning Glass Works.
Harrop Osciplate ™-A brochure=U.S. Pat. No. 3,433,468.

Primary Examiner—Arthur D. Kellogg
Attorney, Agent, or Firm—Ronald C. Hudgens; Robert F. Rywalski; Paul T. Kashimba

[57] ABSTRACT

Some free water containing glass batch agglomerate formulations when attempted to be dried and heated in a vertical bed prior to being discharged to a glass melter for vitrification convert into large aggregates which cannot be suitably supplied to the melter. The present invention solves this process disabling aggregate formation by treating such agglomerates in a preconditioning chamber(s) prior to supplying them into a vertical bed so as to preclude serious aggregate formation in either the preconditioner or the vertical bed. Such treatment is employed in manufacturing glass with a fossil fuel fired melter or an electrically operated melter.

69 Claims, 3 Drawing Figures

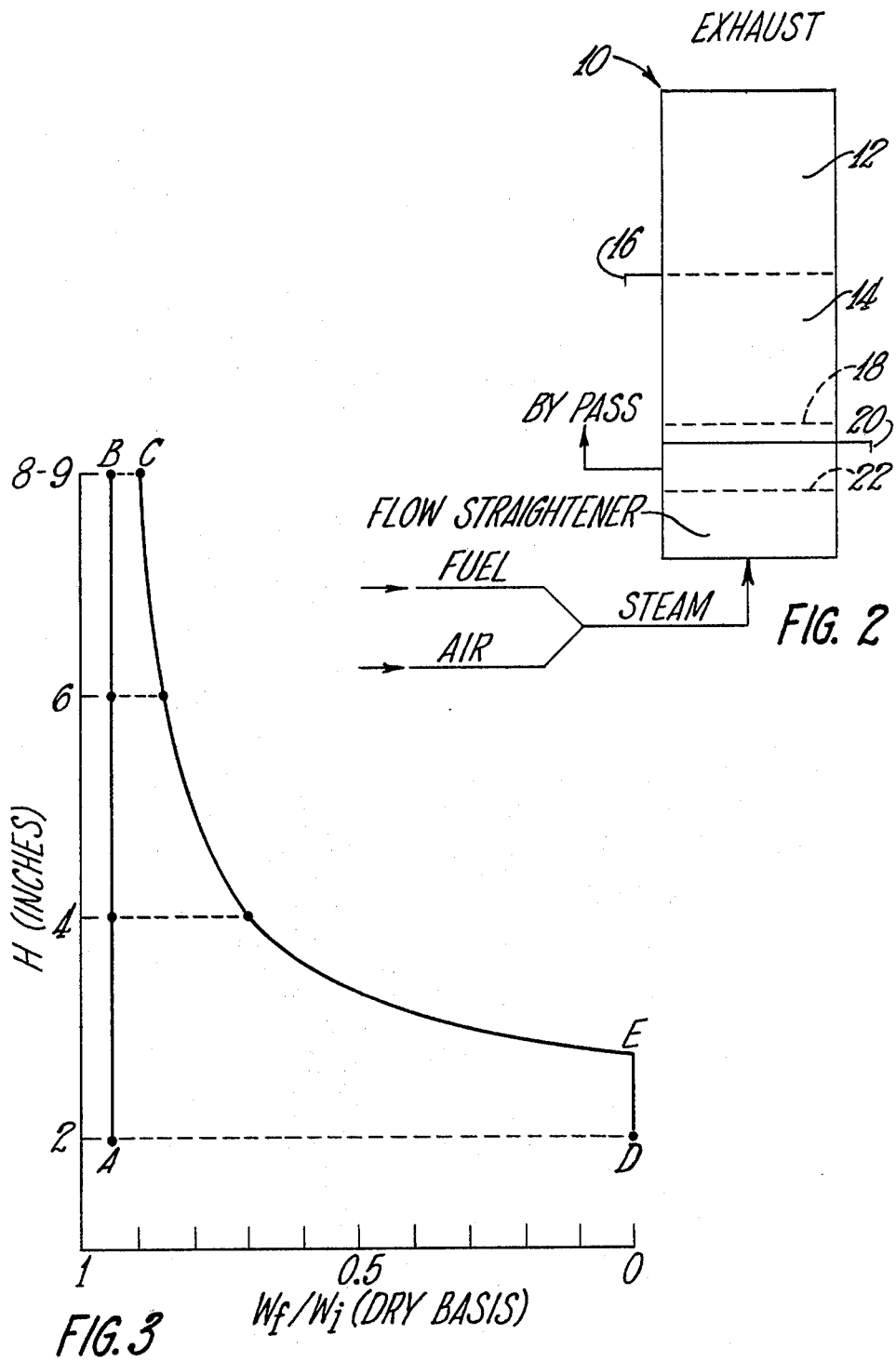

4,248,615

POLLUTION ABATING, ENERGY CONSERVING GLASS MANUFACTURING PROCESS

CROSS REFERENCE

This is a continuation-in-part of copending application U.S. Ser. No. 031,368 filed Apr. 19, 1979 now abandoned which is hereby incorporated by reference.

TECHNICAL FIELD

The present invention relates to the art of glass manufacturing; more specifically the present invention relates to the art of glass manufacturing wherein glass forming batch ingredients are formed into agglomerates which are fed to a melter for vitrification. Even yet more particularly the present invention relates to a process of glass manufacturing wherein agglomerated glass batch ingredients are dried and preheated to an elevated temperature by direct contact with products of combustion, e.g. flue gases from a fossil fuel fired melter, so as to provide an economical glass manufacturing process with improved throughput and which enhances pollutant recovery and minimizes energy losses and/or energy consumption.

BACKGROUND AND SUMMARY OF THE INVENTION

The glass industry, in general, is aware that glass forming batch ingredients can be combined with water to form agglomerates which agglomerates may be dried and heated and then charged to a glass melting furnace. It is also recognized in the glass industry that the flue gases emanating from a fossil fuel fired melting furnace can have a significant roll in such processes. That is, instead of wasting energy in such flue gases, including flue gases which have undergone heat exchange in a recuperator or regenerator, as had previously been done by discharging such gases to the ambient, the flue gases may be used as a source of energy. It is also known to minimize pollutant discharge to the atmosphere, and simultaneously beneficially employ such energy, by transferring at least a portion of otherwise wasted flue gas energy to the agglomerated glass batch by direct contact therewith prior to discharge into the melting furnace.

Some of the most economical of such process teachings of the prior art work well for many glass batch formulations but these teachings are entirely unsuitable for an economical, industrial exploitation of such processes as applied to certain other agglomerated glass batch formulations. Such unsuitability is especially acute in instances of agglomerating certain glass batch formulations with water into the form of pellets. Such water containing agglomerates, to which the teachings of the prior art are ill-suited will henceforth be referred to as "hydrologically unstable" agglomerates. The term hydrologically unstable will be subsequently clarified and the term agglomerate includes within its scope any composite, intergral, discrete, self-supporting mass which includes substantially all essential glass forming batch ingredients. Unless the contrary is indicated, the term agglomerates comprehends within its scope extrusions, disks, briquettes, pellets or other discrete geometric shapes. Normally a maximum dimension of either height, length, or width or diameter of such agglomerates will be on the order of one or two inches and specifically with regard to pellets the maximum diameter will be preferably less than one inch and more typically in a size range of about ⅜ of an inch to about ⅝ of an inch.

It should be borne in mind that the glass industry is a highly capital intensive industry generally operating on low profit margins and high production rates. Thus, for any process to merit industrial exploitation in the glass industry such process must be compatible with the economic nature of the industry. Some of the factors involved include the necessity of low capital expenditures for new equipment installations, and a process which has low operating cost. Included in the latter consideration are not only manpower requirements but also, for example, floor space requirements, as such space is at a premium in virtually all glass industry plants, equipment susceptible to minimal breakdown and damage, and equipment utilizing a minimum amount of operating power. In the context of drying and heating water-containing, glass batch agglomerates with flue gases from a fossil fuel fired melting furnace, the most desirable process equipment of the prior art is a shaft type heater, or chamber, i.e., a vertical bed of substantial height, and preferably a bed in which the agglomerates flow downwardly through the chamber and in which the flue gases flow counter-current to the agglomerates, to substantially continuously, in a single processing operation, dry and preheat them.

Some glass batch agglomerates are, however, unstable and substantially continuous drying and heating in a single operation in a vertical bed is not obtainable. When such water-containing glass batch agglomerates, and especially pellets, are processed in direct contact with, for example, flue gases from a glass melting furnace, which flue gases have passed through a dry portion of the bed to preheat them, the wet agglomerate containing portion of the bed, when at a height in excess of a characteristic value, will aggregate into a strong, rather massive, monolithic type structure, or structures, which plug the shaft heater. This unacceptably necessitates shutdown and results during drying and at temperatures which are well below those which would cause the agglomerates to thermally sinter or fuse together. The height at which aggregate formation occurs is greater for a vertical bed dried and preheated with hot, or warm, dry air, or dry combustion products than where the drying and preheating is done with wet air or wet combustion products, like the flue gases from a fossil fuel fired glass melting furnace. If ambient air is heated, or warmed, at constant humidity, or if combustion is practiced with a large excess of air, such gaseous heating medium may typically, for example, have a wet bulb temperature on the order of about 80° F. to 85° F. (26°–30° C.) and perhaps less. In contrast however, the flue gases from a fossil fuel fired glass melting furnace are the products of stoichiometric combustion and are more humid, or wet; typically they have a wet bulb temperature on the order of about 130° to about 140° F. (54°–60° C.) or higher. This indicates that a significant factor in aggregate formation is the psychrometry of the gaseous heating and drying medium, for example the wet bulb temperature. This is not to imply however, that the use of warm, dry air is satisfactory. First of all, relative to the use of a fossil-fuel fired melter, if such warm dry air had to be separately provided it would increase cost and would not be compatible with the purpose of recovering at least some of the energy normally wasted in the furnace flue gases, nor with attempting to remove pollutants from the furnace flue gas. Furthermore, even the use of such heated dry air does not eliminate aggregate formation. For example, it has been found when directly heating a bed of free water containing pellets with a gaseous heating medium comprising combustion products and having a web bulb temperature of about 80°-85° F. by passing such medium through the bed, that a bed of a height of up to about 8 or 9 inches was characterized by the pellets generally remaining as discrete, free flowing individual pellets. Above that height, however, the pellets were aggregated and no longer free flowing. Such occurrence obviously is unsuitable inasmuch as a typical shaft type heater, or vertical bed of agglomerates, must be in excess of several feet, e.g., ten or more, to maintain compatibility with the pull rate on a melting furnace and provide a sufficient retention time so as to be able to preheat the pellets to the maximum temperature possible, but short of causing the agglomerates to sinter together, and also to allow sufficient agglomerate-flue gas contact time to separate pollutants from the flue gases.

Thus, it will be seen from the above that there is a problem in the glass manufacturing industry with the above type indicated processes in that certain types of free water-containing, glass batch agglomerates simply cannot be suitably processed in a vertical bed. In accordance with the present invention, this problem has now been solved and an improved process is provided. Some of the advantageous features of the present improved process include the ability to substantially continuously dry and preheat such glass batch agglomerates, using a vertical bed, while substantially simultaneously recovering pollutants from flue gases of a glass melting furnace in the bed for recycle into the glass melter. With, for example, $Na_2O$ and $B_2O_3$ containing glasses, otherwise potentially wasted boron values are recovered in the vertical bed as a sodium borate, e.g. $NaBO_2$, and recycled to the melter. This has the advantage of enhancing the quality of the atmosphere and additionally saves on raw material costs. In conjunction with that, the process recovers otherwise wasted energy, reduces the amount of energy which is normally consumed in a glass melter for melting glass batches and will significantly increase furnace throughput per square foot of melter area. In fact, it is not uncommon to double the throughput per square foot of melter area. Furthermore, the improved process recognizes the economic nature of the glass manufacturing industry and provides for a maximization of economic benefit with a minimization of economic detriment in order to obtain that benefit. Thus, for example, the improved process is not highly capital intensive and is characterized by low operating costs. The significance of the above in light of today's economic conditions, will be appreciated by all.

In passing it should be mentioned that realization of the above type advantages, is not limited to the use of a fossil-fuel fired melter. They may, likewise, be obtained in manufacturing glass by using a melter in which the energy is electrically supplied. In the latter instance instead of using melter flue gases, agglomerate drying and preheating is effected by using separately provided products of combustion for the heating medium and, thereby, the amount of more expensive electrical energy needed for the melter is significantly decreased. Corresponding increased throughputs will also be realized. The heating medium is obtained by the combustion, preferably with a substantial stoichiometric excess, e.g. at least about 50%, typically about 50% to about 400%, of air with any suitable fuel such as coal, oil, natural gas, propane, or the like, depending on cost and availability. In some instances it may even be economically expedient that the heating medium be heated air, for example electrically heated air.

The foregoing problem is solved, and the advantageous features attained, by providing for an improvement in glass manufacturing processes of the type comprising combining glass-forming batch ingredients and water into free water-containing glass batch agglomerates, preferably pellets, continuously directly contacting glass batch agglomerates in a vertical bed with flue gases from a glass melting furnace so as to preheat the agglomerates, discharging preheated agglomerates from a lower portion of the bed, charging preheated agglomerates to a melting furnace and melting the charged agglomerates therein. The improvement resides in adapting such processes to the use of free water-containing glass batch agglomerates which are hydrologically unstable and further comprises accumulating a predetermined amount of such agglomerates in a preconditioning chamber, preferably a plurality of separate chambers operated in a sequential, parallel flow fashion, so as to form a preconditioning bed(s) of a predetermined height, directing flue gases from said vertical bed into said preconditioning chamber and passing said gases through said preconditioning bed so as to heat the bed for a sufficient period of time to form a hydrologically stabilized bed of agglomerates and discharging the agglomerates of the hydrologically stabilized bed and supplying them to the vertical bed. Generally, the height of the preconditioning bed or beds will be significantly less than the height of the vertical bed, e.g. typically less than 5% of the height of the vertical bed.

In accordance with another aspect of the present invention, the foregoing advantageous features are obtained by providing an energy efficient, pollution abating, substantially continuous glass manufacturing process comprising, forming separate beds of free water-containing glass batch agglomerates, discharging the agglomerates of the beds, after at least some heating, into a shaft-type preheating chamber having a vertical bed of agglomerates therein, substantially continuously releasing dry, further heated agglomerates from the vertical bed, charging the dry, further heated agglomerates to a combustion-fired melting furnace, melting the agglomerates therein and, substantially simultaneously conveying flue gases from the furnace to the chamber, through the vertical bed therein so as to further heat the agglomerates of said bed, and then from the vertical bed through said separate beds so as to heat the agglomerates of the separate beds. The separate beds will be heated prior to discharging the agglomerates of the respective beds for a sufficient period of time to assure that they will not form process disabling aggregates in the preheating chamber but the period of time will be insufficient to cause the respective separate beds themselves to convert, or cement, into process disabling aggregates. Preferably, the separate beds are sequentially formed and sequentially heated for the prescribed period of time. That is, while an individual bed is treated in a batch-like sequence, the cycles of the respective plural beds will be such that overall, the heating of the separate beds, and discharging, will be generally along the lines of a continuous processing step. Desirably, the separate beds will be disposed downstream of the vertical bed in a general parallel flow arrangement and will be located adjacently upwardly of the preheating chamber with the flue gases from the chamber being conveyed to the beds also in a parallel flow type manner.

In accordance with another aspect of the invention, there is provided a glass manufacturing process comprising forming separate beds of free-water containing, glass batch agglomerates, and, after at least some heating, discharging the agglomerates of said beds, and supplying them into a shaft type preheating chamber having a vertical bed of agglomerates therein, substantially continuously releasing dry, further heated agglomerates from said vertical bed, charging said dry, further heated agglomerates to a glass melter and melting said agglomerates therein, while conveying gaseous combustion products to said chamber, through said vertical bed so as to further heat said agglomerates, and then from said vertical bed through said separate beds so as to heat the agglomerates therein. The gaseous combustion products may be flue gases from a melter, or the melter may be electrically powered and the combustion products provided by burning air and a fuel.

Yet another aspect of the invention provides an improved glass manufacturing process of the type comprising, combining glass forming batch ingredients and water into free water containing glass batch agglomerates, continuously directly contacting glass batch agglomerates in a vertical bed with gaseous combustion products so as to preheat the agglomerates, discharging said preheated agglomerates from a lower portion of said bed, charging said preheated agglomerates to a melting furnace and melting said charged agglomerates therein. The improvement resides in preventing hydrologically unstable agglomerates from forming large (process disabling) aggregates by continuously supplying said hydrologically unstable agglomerates to a preconditioning chamber so as to form a preconditioning bed of progressively increasing height, discontinuing the supply to said chamber and directing said gaseous combustion products from said vertical bed into said preconditioning chamber and passing said gaseous combustion products through said preconditioning bed so as to heat said preconditioning bed of hydrologically unstable agglomerates for a sufficient period of time to form a hydrologically stabilized bed of agglomerates, discharging the agglomerates of said hydrologically stabilized bed into said vertical bed.

Further in accordance with the present invention there is provided an improved glass manufacturing process comprising discharging a supply of free water containing, hydrologically unstable, glass batch agglomerates gravitationally downwardly, discontinuing said discharging at a predetermined interval and intercepting said gravitationally downwardly discharged supply so as to form said supply into a shallow static bed of substantially uniform height, directly heating said static bed so as to remove at least some free water from the agglomerates and convert said bed to a hydrologically stabilized bed, discharging the agglomerates of said stabilized bed and supplying them to a vertical bed, said vertical bed being maintained at a predetermined minimum height, gravitationally flowing the discharged agglomerates generally downwardly through said vertical bed, heating said vertical bed, including said generally downwardly flowing discharged agglomerates to an elevated temperature by direct contact with a gaseous heating medium passing through said vertical bed, supplying said heated flowing agglomerates after flowing through said vertical bed to a glass melting furnace and melting said agglomerates therein.

The present invention, in addition to the previously indicated advantages, provides outstanding pollution-abatement features when the heating medium are the flue gases of a fossil-fuel fired melter. That is, materials in the heating medium, especially flue gases, which normally decrease environmental quality are reclaimed and recycled into the melting operation. Particulates, for example, are separated by a filter-type action. If desired, a cyclone, downstream of the agglomerate beds, may be employed to effect further reclamation of materials. Some materials are reclaimed by an in-situ reaction and some gaseous polluting species, because of the progressive temperature drop of such flue gases during operation, are reclaimed by a condensation type mechanism. Of course, however, the temperature of the gases during operation will not be allowed to drop to the point where water vapor therein will undergo condensation.

EXEMPLARY PRIOR ART

U.S. Pat. No. 3,880,639 discloses a process for heating agglomerates with flue gases from a glass melting furnace to recover $SO_x$ values. The patent generally indicates that drying of the pellets may be done by means of heated air or in an oven after which the pellets may be supplied to a heat exchanging reactor. There is no recognition in this patent of, let alone a solution to, the problem noted above inasmuch as the patent indicates that wet pellets may be fed directly to the heat exchanger-reactor and contacted therein with furnace flue gases. Similarly, difficient are the teachings of U.S. Pat. No. 3,788,832, which discloses drying agglomerates, for example briquettes, in warm air and then preheating the dried material with combustion gases prior to delivery to the furnace, as this patent also states that compacted glass batch can be dried and simultaneously preheated.

U.S. Pat. No. 3,767,751 appears to generally allude to problems with drying certain types of batches in Column 2 but the solution to that problem is allegedly obtained by special pelletizing equipment so as to pelletize at temperatures between 100° C. to about 600° C.

U.S. Pat. No. 3,728,094 discloses a process wherein agglomerated particles, e.g. pellets, are fed to a compartmentalized belt drier with the drying gas being waste gas originating at a glass melter and passing through a stack furnace wherein the particles are heated after leaving the drier. Such a drier would appear to be a rather massive piece of equipment requiring high capital expenditures and would be subject to high operating cost and hence is not desirable. Not insignificant factors of such operating costs will be water condensation and belt plugging problems. Furthermore, there is no recognition of the aggregate formation problem in that patent, as the patent indicates that the compartmentalized drier may be by-passed or eliminated. The drying and preheating process with flue gases from a melting unit, as set forth in FIG. 4 of U.S. Pat. No. 4,113,459, likewise has no recognition of the aggregate formation problem.

U.S. Pat. Nos. 3,726,697 and 4,026,691 represent high capital expenditure processes with high operating cost since the rotary driers and traveling bed vessels they respectively disclose are relatively massive structures. Furthermore, both of these patents teach an affirmative prereaction of the alkali metal oxide source compound and the alkaline earth metal oxide source compound prior to formation of pellets or granules. Such an additional step is not needed in accordance with the present invention and it only serves to increase manufacturing costs.

In *Glass*, February 1965, pages 68 and 69, there is a discussion with regard to drying granules of soda containing glass batch. The discussion indicates that with a brick shaft and also a cellular drier, granules adhered into a compact mass and that a special belt drier was developed for the use of flue gases. The provided design data with regard to the drier would indicate it to be impractical for use. In a translation of "Moglichkeiten der industriellen Pelletierung von Glasgomengen", *Glastechnische Berichte* 50 (1): 19-23 (1977) it is also indicated that pellets of alkali metal oxide containing glass batch may be heated with oil, natural gas, coal or flue gases from a melting furnace in what would appear to be a special unit which is termed a drying belt. The drying belt is described as consisting of a traveling grate in the form of a revolving series of troughs with perforated bottom; the pellets are said to be dried by introducing them into these troughs or containers using a temperature program which can vary with different batches.

U.S. Pat. No. 2,366,473 relates to a process of producing nodular or pebble like units and refers to a chemical set taking place with powdered glass, or ground silica, and soda ash. The patent indicates that drying may be effected in a rotary drum employed in the nodulating operation, or by conveying the nodules on suitable conveyors through drying rooms or the use of other convenient driers. It is also indicated that hardening of calcium oxide or hydroxide containing batches may be hastened by exposing the bodies in trays or on moving conveyors to flue gas or another gas rich in carbon dioxide but no specifics are provided. U.S. Pat. No. 2,220,750 discloses drying soda containing ingredients during a milling operation or by exposure to the atmosphere or that dryers of the rotary, belt or other convenient type may be used. It is indicated that the agglomerated masses may be dried to any desired free water content so long as the masses are non-sticky. Preference is expressed for removal of all water but it is indicated that this is not necessary since the remaining water will be driven off in the melting pot or tank.

DESCRIPTION

The present invention is generally applicable to glass batch formulations which when agglomerated with water form hydrologically unstable agglomerates. Usually the amount of water used to form the agglomerates will be between about 5 to about 20% by weight on a (dry basis) and will vary with different glass batches and the agglomerate forming technique. When, for example, forming pellets on a rotating disc, typical water contents of the formed pellets will be about 10 to about 15%. As a general matter it will be preferred to form the pellets, and agglomerates generally with the minimum amount of water that can be employed and yet provide adequate wet, or green, strength; too much water will tend to complicate processing because, so to speak, the agglomerates will be stickier. Of course, as will be readily apparent, well mixed batch should be employed to reliably produce consistent quality pellets. Specific glass batch formulations to which the present invention is especially uniquely adapted are exemplified by the alkali metal oxide containing glasses in which the alkali metal oxide source in the batch ingredients is present in a sufficient quantity to cause free water-containing batch agglomerates to be hydrologically unstable. By hydrologically unstable is meant that when batch ingredients are formed into agglomerates with water the following characteristic of the agglomerates will result. This characteristic is the propensity, or natural inclination, of such agglomerated glass batches, when individual agglomerates are positioned on themselves in a vertical bed and then dried, to form, or coalesce into, a rather massive aggregate, or aggregates, i.e., monolithic structures composed of a multitude of firmly adhered individual agglomerates. That is, when attempting to simultaneously dry and preheat agglomerates containing free, or bound, water to a temperature in excess of the boiling point of water in a shaft type vertical bed by continuously passing a gaseous drying-and-heating medium containing combustion products and having a wet bulb temperature between about 130° F. to about 140° F., or higher, therethrough, i.e., a wet bulb temperature like that of melter flue gases, the wet agglomerates will form an aggregate, or aggregates, of the individual agglomerates and the agglomerates no longer remain as substantially individual units. Aggregate formation precludes free flow under the influence of gravity through and from the bed and likewise dramatically decreases passage of the drying and heating medium through the bed. In short, such aggregate formation is process-disabling. Such occurrence is the result of drying and is not caused by sintering of agglomerates, i.e., the problem is in the nature of forming a cement during drying and not sintering. When so drying (i.e., removing substantially all free water, for example to less than about 0.5% on a dry basis), such hydrologically unstable agglomerates, a given formulation generally will have an easily determinable characteristic aggregate forming height and such height precludes the practical utilization of a vertical bed, or shaft type heater, to dry and preheat agglomerates in a single processing operation. This height may be only a few inches, whereas the vertical bed will commonly need to be in excess of, for example, 10 feet and typically 15-20 feet.

More specifically, exemplary hydrologically unstable batch formulations are the sode containing glasses. The source of soda ($Na_2O$) in such batches will be a sodium carbonate, e.g., soda ash, or sodium hydroxide or combinations of these materials. The sodium hydroxide may be employed as an anhydrous material, e.g. flakes, or in the form of a convenient aqueous solution thereof in which case the water of that solution may supply some or even all of the water employed in forming the agglomerates. Typically, hydrological instability will be observed when the soda content of the glass, on a theoretical oxide basis, is in excess of several percent by weight, for example in excess of about 5% or 6% by weight of $Na_2O$, and will be especially serious in pellets at a $Na_2O$ content between about 10-20% by weight on a dry theoretical oxide basis.

It will thus be seen that the instability characteristic will exist in some quite common glasses, including fiberizable glasses, container glasses, and plate, or flat glasses. Such glasses may contain $Na_2O$ in an amount between about 5% and about 25% by weight of the final glass and more commonly between about 10% and about 20% by weight. Exemplary of such glasses are the glasses which are predominantely soda lime silica glasses. That is, glasses in which the cumulative amount of silica and calcium oxide and sodium oxide are in excess of about 60% by weight of the total glass. Typically, for containerglass and sheet, or flat glass this amount will be in excess of about 75% and even more commonly in excess of about 90% by weight of the glass. Exemplary of such soda lime silica glasses are those in which the silica content is between about 60% to about 75% by weight, alumina between about 0% to about 15% by weight, calcium oxide between about 5% and 20% by weight, magnesium oxide between 0% to about 20% by weight, sodium oxide between about 10% to about 20% by weight. The raw materials employed in the batch for such compositions typically include sand, soda ash and/or sodium hydroxide, limestone, clay, and burnt dolomite. Quite typically these glasses will include from 0% to 5% by weight of one or more of potassium oxide and/or lithium oxide and occasionally between 0% to about 5% by weight of barium oxide.

Exemplary of the fiberizable glass compositions which are outstandingly adapted for use in the present contemplated process are the alkali-alkaline earth-aluminoborosilicate glass compositions, for example, those compositions wherein the cumulative total weight percents of silica, aluminum oxide, boron oxide, alkali metal oxides and alkaline earth metal oxides is in excess of about 75% or 80% by weight of the glass composition and more typically in excess of about 97% by weight. The soda-lime-aluminoborosilicate compositions are most common. Typically, such latter type compositions include the following ingredients on an oxide basis in approximate weight percents: silica about 55% to about 65%; alumina about 3% to about 6.5%; calcium oxide about 6% to about 10%; sodium oxide about 11% to about 16.5%; and $B_2O_3$ about 3% to about 12%; those compositions may also generally include about 0.1% to about 3% by weight of $K_2O$, about 0.1% to about 0.5% $Fe_2O_3$, and, optionally, 0% to about 0.5% $TiO_2$, 0% to about 3% BaO, 0% to about 0.2% $Li_2O$, and 0% to about 0.5% SrO as well as 0% to about 4.5% of MgO. The raw materials which are employed for such compositions include burnt dolomite, clay, limestone, sand, soda ash, and/or sodium hydroxide, with soda ash being especially preferred. The sources of $B_2O_3$ for these glasses will preferably be calcium borates and/or sodium calcium borates, e.g., probertite, ulexite and/or colemanite supplying minerals or materials. If colemanite is employed, the material, prior to utilization, will be treated by heating it above its decrepitation temperature so as to release water of crystallization. In fact, with regard to any of the raw materials employed, if they are characterized by a sudden, rather violent release of any gases, i.e., they decrepitate, it is recommended that they be so calcined, or burnt, prior to being used to form agglomerates. Such calcium borates and sodium calcium borates are preferred $B_2O_3$ sources because they have relatively high decomposition and/or melting points which thereby allows the agglomerates containing such materials to be preheated, e.g. with flue gases emanating from a fossil-fueled fired furnace, to a temperature which is quite high, e.g., in excess of about 500° C., and even in excess of 600° C. This, therefore, will allow for a maximum heat recovery from the flue gases in contrast to using other sources which could not tolerate such a high temperature of preheat. In the context of electric melting, more expensive electrical energy is saved because the high degree of preheat can be done with cheaper energy (fuel) sources. If a borax is employed, e.g. 5 mole borax, it will be desirable for most suitable operation to limit its amount to less than about 2 or 3% by weight of the batch.

As has been indicated above when free water containing, hydrologically unstable glass batch agglomerates are attempted to be dried to substantial total dryness (less than about 0.5% and more typically to virtually 0% water) in a vertical bed by passing combustion products directly therethrough, having a wet bulb temperature of generally between about 130° F. to about 140° F. or higher, the wet agglomerate bed will, by a cementing type action, convert into a process disabling aggregate, or aggregates. It has been found that, when so drying hydrologically unstable agglomerates with combustion products having a wet bulb temperature corresponding to the approximate wet bulb temperature of furnace flue gases, the agglomerates will have an "inherent, or imminent, aggregate forming height" below which no serious aggregation of a bed results when substantially totally dried but above which it does. Furthermore, it has been found that the height of the bed of wet agglomerates at which serious aggregate formation results is not independent of the psychrometry of the drying and/or heating medium. That is, the imminent aggregate forming height may be adjusted ("adjusted imminent aggregate forming height"), for example, upwardly by decreasing the wet bulb temperature of the drying medium. The latter can be, for example, easily accomplished by dilution of furnace flue gases with air, or by combustion with substantial excess air. While this will be more specifically subsequently exemplified, as an example, an "inherent aggregate forming height" may be on the order of about 2 inches, whereas an "adjusted imminent aggregate forming height" may be on the order of about 8 or 9 inches with a drying medium having wet bulb temperature of about 80° F.–85° F. Such heights may vary with different agglomerate compositions, but they indicate how a bed of wet agglomerates can be preconditioned to a "hydrologically stabilized" state. That is, as indicated, if the height of a wet agglomerate bed is less than certain values, e.g. 2 inches when using a heating medium with a wet bulb temperature of about 130°–140° F., or 8-9 inches when the wet bulb is about 80°–85° F., the bed can be substantially totally dried without serious aggregation; furthermore the dry agglomerates of such beds can then be further heated to an elevated temperature in another bed, likewise, without serious aggregation. The latter bed for preheating to an elevated temperature can be a vertical bed in a shaft type preheating chamber with the height of the vertical bed being maintained at a suitable predetermined minimum value which is significantly greater than the above indicated aggregate forming heights.

It has also been further found that when drying a bed of wet hydrologically unstable agglomerates, the bed passes through a unique state where, after at least some heating so as to remove some free water, the bed may also be termed "hydrologically stabilized". This has been observed with beds of hydrologically unstable agglomerates under conditions which, if the bed were to be substantially totally dried, would seriously aggregate. That is, the amount of free water which has been removed when the bed is in this hydrologically stabilized state has not yet reached the point which causes the bed itself to convert into process disabling aggregates and, surprisingly, if the bed is discharged during that state, for example by dropping the bed into another chamber, the agglomerates can then be further heated to not only remove the remaining free water, (without process disabling aggregate formation in the latter chamber) but also preheated in the same chamber to a substantially elevated temperature for feeding to the glass melter. The latter chamber, may be a shaft type preheating chamber having a vertical bed of substantial height in it. This finding makes it possible to employ a bed of the hydrologically unstable agglomerates which has a height that is greater than the inherent aggregate forming height of the agglomerates, and even greater than the adjusted imminent aggregate forming height of the bed corresponding to the wet bulb temperature of the medium passing therethrough, by discharging such bed and supplying the agglomerates which formed the bed to a main vertical bed, for preheating to an elevated temperature, when the bed has been properly preconditioned to its hydrologically stabilized state.

Thus, by employing plural, e.g. at least 2, separate preconditioning beds, preferably operating on a sequential or cyclic basis, those beds can be discharged to a main vertical bed of a shaft type preheater and further processed therein without encountering operation-discontinuing aggregation in either the preconditioning beds or the main vertical bed. The height of the vertical bed is thus maintained at some predetermined minimum value by the cyclic, sequential discharging of the preconditioning beds thereto. Generally, the amount of hydrologically unstable agglomerates which will be accumulated to form the separate preconditioning beds will be such that the height of the formed bed will be no greater than, and typically will be less than, the adjusted imminent aggregate forming height which corresponds to substantially completely drying the bed with ambient air which has been heated at substantially constant humidity. Bearing in mind that it is desired to preheat dry agglomerates to an elevated temperature by countercurrent, direct, heat exchanging contact of the agglomerates and a heating medium (e.g. flue gases from a furnace or separately provided combustion products) in a vertical bed, it will be apparent that the temperature of the heating medium will progressively decrease as it passes through the bed. It is also desired to use such medium after such heat exchange to precondition hydrologically unstable agglomerates to a hydrologically stabilized state, also by a direct contact operation, in which the agglomerates of the preconditioning bed have substantially no relative movement, so as to further remove pollutants from the drying medium. The temperature to which the medium is cooled in a vertical bed before it is used to precondition the preconditioning beds will vary with different installations and will be routinely selected based on various considerations including, for example, the maximum temperature to which the agglomerates can be heated without sintering, the desired temperature to which the agglomerates will be heated, the temperature of the flue gases (after cooling in a recuperative or regenerative type heat exchanger) supplied to the vertical bed, the heat capacity of the agglomerates which, in turn, will depend on glass composition, production rates, radiation heat losses from the shaft type preheater in which the vertical bed is maintained, and the like. That temperature may for example be 200° F.–800° F., more typically about 350° F. to 700° F., e.g. 400° F. to 600° F. Consequently, in order to determine a typical desirable maximum bed height for the preconditioning chambers the adjusted imminent aggregate forming height will be determined using a heating medium having a dry bulb temperature of that selected temperature and a wet bulb temperature approximately that of ambient air. Thus, the maximum height may be approximately determined by, for example, determining the adjusted imminent aggregate forming height of a bed of hydrologically unstable agglomerates which corresponds to using a heating medium which is ambient air that has been heated at constant humidity to that selected dry bulb temperature, e.g. a heating medium having a dry bulb of 350° F. and a wet bulb of about 80° F.

The above generally shows that various options exist with regard to process operation and, more specifically, with regard to preconditioning. It is thus possible to operate such preconditioning beds by passing flue gases therethrough, after counter current heat exchange contact with agglomerates in the vertical bed, by employing a preconditioning bed height which is less than the inherent aggregate forming height. Similarily, it is possible to use a preconditioning bed height in excess of the inherent aggregate forming height by diluting, or combining, the flue gases (so as to decrease the wet bulb temperature) of the main vertical bed prior to entry into the preconditioning beds with ambient air and operating the bed at a height which is less than the adjusted inherent aggregate forming height corresponding to the psychrometry of the diluted flue gases. No process disabling aggregation will result with the above even if the preconditioning beds are totally dryed prior to discharging them to a main vertical bed for further heating. Likewise, by diluting the flue gases with air after passage through the main vertical bed and prior to their being directed into the preconditioning beds, it is possible to operate the preconditioning beds at a height in excess of the adjusted imminent aggregate forming height corresponding to the psychrometry of such diluted flue gases by discharging the preconditioning beds when they are in their unique hydrologically stabilized condition to a vertical bed. The same considerations apply when electric melting is contemplated in which case, instead of using flue gas from a melter, separate combustion products are provided; the psychrometry of such products may be controlled during combustion by the use of excess air or by dilution. If desired the heating medium for electric melter operation may be heated ambient air.

Generally the process will be operated so that the temperature of the gases will not drop so low as to create water condensation problems. To assist in this regard the air, with which the combustion products, e.g. flue gases, are combined or diluted prior to entry into the preconditioning beds, may be heated. Such combination will also increase the drying rate of the preconditioning beds. Such heated air may be produced by combustion of a suitable fuel with an excess of stoichiometric air or available "spill air" may be employed. Spill-air generally is the excess of needed combustion make-up air after heating of air in a recuperator, or regenerator.

FIG. 2 is a schematic view of a preconditioning chamber.

FIG. 3 is a preconditioner operating curve.

Figure 1:
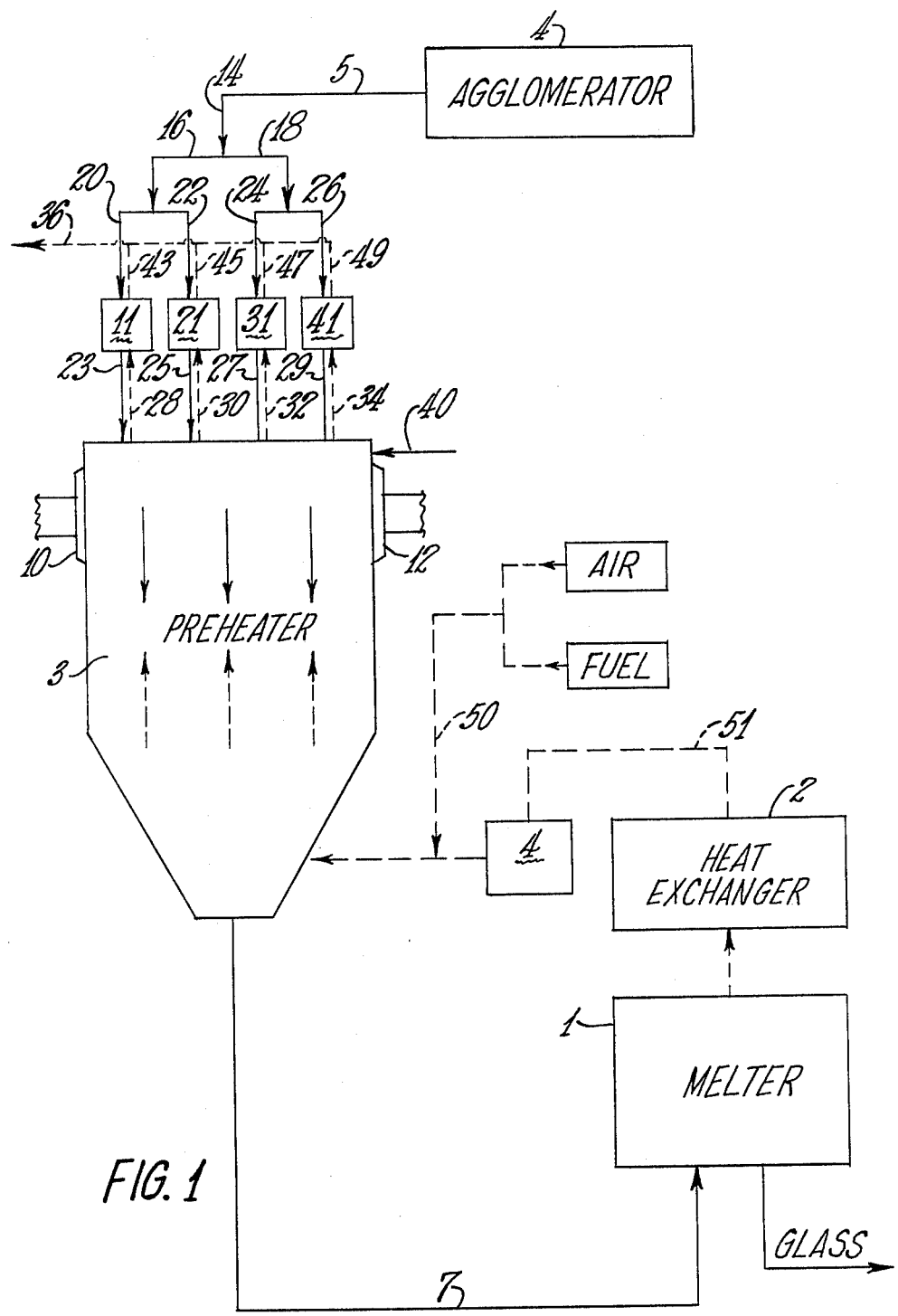
FIG. 1 is a schematic flow diagram of the process of the present invention.

Referring now to FIG. 1 of the drawings, there is set forth a schematic flow diagram which represents a desirable manner of industrially exploiting the present invention. In the drawing, the flow paths of vapor are indicated by dashed lines and the agglomerate flow paths by solid lines. Referring to the drawing there is generally shown a combustion fired glass melter 1 from which molten glass issues. The products of stoichiometric combustion, as is known in the art, are passed through a heat exchanger 2, for example a recuperator or a regenerator, where they undergo indirect heat exchange contact with combustion makeup air (not shown). There is also provided a shaft type preheater 3 maintaining a vertical bed of agglomerates, with the preheater preferably containing an upper substantially cylindrical portion and a lower inverted frusto-conical portion. Preferably, the ratio of the height of the cylindrical portion to the height of the frusto-conical, or funnel, portion is about 0.8 to 1, with the height of the cylindrical portion being about one and one-half (1.5) to about twice the diameter of the cylindrical portion. Desirably, the superficial velocity of the flue gases through the cylindrical portion will be between 60 to about 130 standard feed per minute. The included angle between diametrically opposed side wall portions of the funnel desirably will be 30°–40°, preferably 36°. Flue gases from heat exchanger 2, e.g. having a temperature of 1000° F. to 1500° F. or even higher, are conveyed through a duct 51 and then directed to a lower portion of preheater 3 and passed counter currently to the gravitationally downwardly flow of the agglomerates therein so as to preheat the agglomerates to an elevated temperature. The flue gases enter, in a preferred arrangement, the preheater on diametrically opposed sides of the funnel and beneath an inverted V, or wedge shaped, flow distributor. The flow distributor is in the form of a bar extending between the entry ports for the flue gases and has an included angle of about 60°. Desirable gas distribution through the preheater will be obtained if the level of pellets above the flue gas inlets are maintained at a height of about equal to, to about 1.5 times, the diameter of the cylindrical portion. While for any given installation some adjustments will need to be made, it will be desirable to locate the wedge in the funnel portion such that its base, or bottom terminous, is at a level, beneath the juncture of the funnel and cylindrical portion, equal to about 0.1 to about 0.5 times the diameter of the cylindrical portion. As will be appreciated by those skilled in the art, as the agglomerates flow past the wedge shaped distributor, a void area, or more exactly a void volume, will generally form adjacently beneath the apex of the wedge. This area may be viewed as diamond shaped with the uppermost portion being defined by the internal surfaces of the inverted V-shaped bar and the lowermost portion, which is largely governed by the angle of repose of the agglomerates employed, being a V-shaped portion. Suitably, the wedge will be positioned in the funnel such that the open area, for pellet and gas flow around the wedge, will approximately be equal to about the total surface of the V-shaped lowermost portion. Prior to entry into preheater 3, it is preferred to pass the flue gases through a chamber 4, in the nature of a slag box, so as to separate some of the larger entrained, materials therefrom. Generally the agglomerates will be heated to as high an elevated temperature as practicable but short of causing the agglomerates to sinter together. The heated agglomerates are discharged from a lower portion of the bed and, without significant cooling, are directly transmitted by a suitable conveyor 7, e.g. a screw conveyor, to a melter for vitrification.

The shaft type preheater may include, in an upper portion, of the upper cylindrical portion, a heat exchanger of a type containing a plurality of generally rectangular elongate ducts (not shown). For further details reference may be had to copending application U.S. Ser. No. 924,274, filed on behalf of Messrs. Erickson and Hohman. The heat exchanger includes an inlet manifold 10 to receive a suitable heat transfer medium, for example air, and outlet manifold 12 through which the heat transfer medium is withdrawn from the ducts of the heat exchanger proper. Generally the heat exchanger provides flexibility in the operation by allowing for control of the dry bulb temperature of the flue gases.

Located downstream of the shaft type preheater 3 are at least two preconditioning chambers and further downstream is an agglomerator 4. The agglomerator itself may be any conventional piece of equipment available in the art for combining glass forming batch ingredients and water into free water containing agglomerates. Typically the amount of water, as previously indicated, in the agglomerates will be about 5 to about 20% by weight. Preferably the agglomerator will be a conventional rotary disc pelletizer. The amount of water typically employed to produce the pellets will generally be between about 10 to about 15% by weight and more typically on the order of about 10 to 14% by weight. While pelletizing is an art and the pelletizer will need to be adjusted for optimum results on any specific glass batch, it is desirable to control the pelletizer using the water control scheme generally set forth in copending application U.S. Ser. No. 965,632 filed on behalf of Mr. Seng. That is a pivotally supported paddle type sensor which may be spring biased or counterweighed, is employed to control the feed of water to the pelletizer. Preferably the paddle will be located in the finished pellet stream, as set forth in copending application Ser. No. 974,470 filed on behalf of Mr. Henry, generally in a central portion of a sector of the disc defined between about an 8 to 9 o'clock position and positioned away from the disc wall about 40% of the disc radius. The water supply will include one duct supplying a constant flow of water to a main supply line and a second duct containing a solenoid valve also in fluid communication with the main supply. The paddle sensor is used to operate the solenoid valve in an on-off fashion, as set forth in the above Seng application so as to produce substantially uniform size pellets. Generally, when facing the inclined rotary disc pelletizer and considering the uppermost portion as the 12 o'clock position, batch will be supplied to the pelletizer along a chord of the disc between about the 5:30 and 6:30 positions with the water supply being furnished by sprays located generally on a chord between the 4 and 8 o'clock positions and to the right of a diameter running through the 6 and 12 o'clock positions of the circular disc of the pelletizer. Desirably the pelletizer will also be equipped with a rotary scraper device. This device includes two pairs of generally normally related arms with each arm having a radius of about one-half the radius of the pelletizer disc and has its axis of rotation about midway along the radius of the disc drawn to about the 3 o'clock position. One pair of arms, which may be viewed as a diameter of the circle through which the device rotates, includes scrapers at its diametric end portions adapted to scrape the sidewall of the rotating disc pelletizer. The other pair of arms include diametrically opposed scrapers operating closely adjacent to the bottom of the disc of the pelletizer. The disc will also be provided with a stationary plow extending inwardly from about the 11:30 position and intersecting a diameter through the 6 and 12 o'clock positions at an angle of about 45°. Excellent results have been obtained using a rotary disc having about a 6-8 min. dwell time. Ser. No. 974,470 illustrates an alternate water control scheme. When manufacturing pellets, it is also preferred, although not shown, to coat the pellets with a thin layer of particulate batch material so as to enhance the handling characteristics of the pellets. This may be done in accordance with the teachings of copending application U.S. Ser. No. 031,290. It is also preferred to pass the pellets through a suitable sizing device (not shown) such that the pellets to be further processed generally have a maximum dimension in the range of about ¼ to about 1 inch and most desirably between about ⅜ to about ⅝ of an inch. Undersize pellets may, if desired, be recycled directly to the pelletizer.

The free water containing agglomerates are then conveyed by a suitable conveyor 5, preferably a FLEXOWALL conveyor, in a generally cyclic, or sequential, manner and in parallel flow paths, to preconditioning chambers 11, 21, 31 and 41 so as to form separate preconditioning beds. Typically these preconditioning chambers will be located adjacently upwardly of the preheater, for example, within a distance of only several feet, like for example, within 5 feet of the preheater and more commonly will be mounted directly on the upper wall of the preheater. More specific details as to a preferred mechanism for implementing the present process are set forth in copending application U.S. Ser. No. 031,369 and in copending application U.S. Ser. No. 095,871 filed concurrently herewith, both of which are hereby incorporated by reference. Generally agglomerates from conveyor 5 are supplied to a main pellet duct 14 and sequentially diverted to ducts 16 and 18. The pellets supplied to duct 16 are then, in turn, cyclically diverted to ducts 20 and 22 and pellets from duct 18, subsequently and sequentially, diverted to ducts 24 and 26. Suitable diverting valves will be employed to effect the above sequential, or cyclic, operation. Ducts 20, 22, 24, and 26 serve to cyclically supply agglomerates, preferably pellets, to the respective preconditioning chambers 11, 21, 31 and 41 so as to form separate static preconditioning beds in the preconditioning chambers.

Generally, a supply of agglomerates will be discharged downwardly through one of the ducts, e.g. 20, by operating an appropriate diverter valve for a predetermined time interval at which time the supply to that duct will be discontinued and supply to another duct will be initiated. The discharged agglomerates fall downwardly from duct 20 into preconditioner 11 and they are intercepted in the preconditioner by a pellet detaining member and formed into a static bed. This member is actually a movable bottom wall of the preconditioner and allows gases to pass therethrough but does not allow the agglomerates to so pass. The formed static bed is then preconditioned after which time it is discharged and the agglomerates dropped downwardly to preheater 3. This is effected by moving the pellet detaining member outwardly from the preconditioner and pushing the agglomerates, as with a doctor blade technique, off the member. Each of the preconditioners has such a pellet detaining bottom wall member, with each sequentially operating to intercept a supply of agglomerates and then discharge preconditioned agglomerates to a main vertical bed.

The heating and drying medium, e.g. the flue gases, enter the bottom portion of the preheater, pass upwardly therethrough, whereby they exchange heat by direct contact with the gravitationally downwardly flowing agglomerates of the vertical bed therein, and then, in a generally parallel flow path, as represented respectively by arrows 28, 30, 32 and 34 are directed to respective preconditioning chambers 11, 21, 31 and 41. In a parallel flow pattern the respective flue gas streams then pass upwardly through the static beds, of the preconditioners and then are exhausted from the chambers in parallel flow paths (43, 45, 47, 49) and then exhausted through a main duct 36. In actual operation exhaust duct 36 will be operatively connected to a suitable fan (not shown) which generally maintains the preheater and the preconditioning chambers under a negative pressure. Prior to being directed to the preconditioning chambers, it is preferred to dilute the flue gases with air and, for purposes of thermal efficiency, it is preferred that this dilution be done subsequent to the flue gas entry into the preheater. Since the preheater and preconditioners are under a negative pressure leakage of ambient air into the system affects dilution and the adjusted inherent aggregate forming height. Preferably the dilution is effected in the head-space above the bed. The air may be introduced by a duct or ducts 40. As previously indicated such air may be ambient air or it may be heated air, e.g. spill air or heated air produced by the combustion of a suitable fuel, e.g. natural gas, with an excess of stoichiometric air. This serves to alter the height of aggregate formation and can also supply energy to increase the drying rate in the preconditioners. After the respective static preconditioning beds of chambers 11, 21, 31, 41 have been heated for a time sufficient to form hydrologically stabilized beds, they are discharged into the vertical bed in preheater 3 as generally represented by parallel flow paths 23, 25, 27 and 29. They are then further heated in preheater 3 to an elevated temperature, discharged from the preheater in a generally continuous fashion and directly supplied by suitable means, like conveyor 7, to melter 1. Preferably the discharging of the preconditioning beds will be in a cyclic, or sequential manner, and will be done by a mere dropping of the beds, e.g. a drop of at least about 1 foot, unto the vertical bed. This dropping action can also serve to separate individual agglomerates from any minor aggregates which may have formed, but the dropping height should not be so high as to fracture the agglomerates.

The preconditioning chambers, as indicated, are preferably operated in cyclic or sequential manner. That is, preferably, each preconditioning chamber has its own cyclic pattern and the respective chamber patterns are desirably sequenced to provide quasi-continuous processing. Each chamber will accumulate a predetermined amount of agglomerates and, since the chamber will be of a fixed dimension, for example a 2'×2'×2' box, each will have formed therein a static preconditioning bed of a predetermined height. This may be done, for example to chamber 11, by supplying pellets from conveyor 5, to duct 16, and to duct 20, whereby a bed of progressively increasing height will form, then discontinuing the supply to chamber 11 by diverting the pellets in duct 16 from duct 20 to duct 22 and thereby supplying pellets to chamber 21 for its preconditioning cycle. The preconditioning bed of chamber 11 is then preconditioned to a hydrologically stabilized bed with gases (28) passing upwardly through the bed and the gases exhausted through duct 43 to main exhaust duct 36. After preconditiong, the static bed is discharged (arrow 23) unto the main vertical bed in preheater 3.

In the preferred embodiment, the respective preconditioners will be mounted directly on the top wall of preheater 3. An opening will be provided in the preheater top wall for each of the preconditioners, with the gases from preheater 3 entering the preconditioner through such opening and the agglomerates of the preconditioned beds falling into the preheater through the same opening. That is, for example, with respect to preconditioner 11, such an opening would be common for agglomerate stream 23 and gas stream 28.

In order to initially start-up the process it is generally preferred to employ separately provided combustion products to form an initial vertical bed in the preheater 3 after which time the system is changed from the separately provided combustion products to the flue gas coming from the melter. This mode of operation is illustrated in the drawing wherein it is shown that air and fuel are provided, for example, to a burner (not shown) and these combustion products are then passed into the preheater through a duct 50 for a time sufficient to provide the initial vertical bed. As in the case with the flue gases, the temperature of the combustion products in duct 50 should not be so high as to cause the agglomerates in the preheater to sinter into aggregates. Preferably, using natural gas as the fuel, the combustion will be with at least a 25% excess of stoichiometric air so that the wet bulb temperature is less than that of normal flue gases (130°–140° F.). Desirably the excess will be 25% to about 300% and preferably about 50% to about 100%. Exemplary dry bulb temperatures will be about 1000° F. to about 1500° F. with suitable wet bulbs being about 100° F. to about 125° F. In fact, when it is desired to apply the teachings of the present invention to a non combustion fired melter, that is, to a melter wherein the energy is electrically supplied, the system will operate as described herein, by usage of separately provided fuel and air combustion products. In such electric melting embodiment, obviously, melter 1 will be electrically powered and the heating medium will be the combustion products supplied by duct 50 since there will be no furnace flue gases to be supplied by duct 51. If desired, however, a vent may be provided from the electric melter to the preheater, so as to enhance pollutant recovery and recycle.

In passing, it should be mentioned that whether involved with the start-up phase of the process for use of a combustion fired melter, whether the embodiment is practiced wherein air and fuel are separately fired and those combustion products used to effect the preheating and drying of the agglomerates which are subsequently electrically melted, or whether actual operation is underway employing a combustion fired melter, it will be important, for most reliable operation, when supplying the agglomerates to the preconditioning chambers that beds be formed which have as substantially a uniform height as reasonably possible. Preferably this is accomplished by using suitable agglomerate flow diverters to distribute the agglomerates substantially uniformly in the chamber. The preferred arrangement for effecting such flow distribution is that set forth in application Ser. No. 031,288.

While actual operating conditions will vary with different installations, the following generally exemplifies typical process parameters. The temperature of the gases entering the preheater, whether they be combustion products resulting from separate firing intended for an electric melter operation or whether they be flue gases coming from the heat exchanger of a combustion fired melter, will be no greater than the temperature at which the specific glass formulation will sinter into massive aggregates. Typically, such temperatures will be in excess of 750° F., preferably about 1000° F. to 1500° F. and a more exemplary temperature being about 1100° F. to about 1250° F. The velocity of the gases passing through the preheater will vary, but suitable ranges will be from about 60 to about 130 standard feet per minute (superficial velocity). As previously generally indicated, the wet bulb temperature of the flue gases from a combustion fired melter will be on the order of about 130° F. to 140° F. but, in the electrical melting embodiment, it will be preferred to practice the combustion with an excess of stoichiometric air such that the wet bulb temperature of the gases supplied to the preheater will be less and desirably in the range of about 100° F. to about 125° F. and preferably between about 110° F. to about 120° F. For convenient operation it will generally be preferred, especially in the case when flue gases from a combustion fired melter are employed, to dilute the gases prior to entry of the combustion products into the respective preconditioners. Generally, suitable operation will be obtained by diluting the flue gases about 100%, i.e. diluting them in a volume ratio of one part of ambient air to one part of combustion gases. Temperatures of the gases, after having passed through the preconditioning chambers will generally be about 200° F. to 500° F. In actual operation it will be desirable to adjust the temperature of the gases entering the preconditioning chambers such that, after passing therethrough, they will be exhausted at a temperature which is as low as possible, but without causing the wet bulb temperature of the gases to be reached as that would cause undesirable condensation. The height of the preconditioning beds may vary with different compositions and can be selected for different operating conditions, but generally they will not be very high. Preferably, especially for a soda-lime-aluminoborosilicate glass, the height will be in the range of about 2 to about 8 or 9 inches. Exemplary actual superficial velocities of the gaseous medium passing through the respective preconditioners will generally be in the range of about 200 to about 500 feet per minute. The optimum actual preconditioning cycle of the respective preconditioning chambers will vary depending, for example, on the composition employed, the water content of the agglomerates employed, the desired production rate, and on the velocities and psychrometry of the heating medium. An exemplary operation, however, when supplying pellets to the preconditioners having a moisture content of about 11.5 to 13% and employing a preconditioning bed height of about 2-3 inches with the dry bulb temperature of the heating medium entering the preconditioner being 400° F. to 600° F. with a calculated wet bulb temperature of about 111° F. (equivalent to about 200% dilution) at a superficial velocity of about 450 (standard) feet per minute through the preconditioner was a cycle wherein the preconditioners were charged and formed to a bed over a period of about 2 minutes, then preconditioned for a period of 6 minutes and then discharged to the main vertical bed.

Some adjustments will, of course, be made in actual operation for purposes of optimization once the general operating parameters have been determined. In order, however, to assist those in making and using the present invention in its fullest scope the following represents laboratory experimental work which can be easily done to obtain the general design and operating parameters for the system. Additionally, the following exemplifies some of the terminology previously employed.

In the following a soda-lime-aluminoborosilicate glass was employed which on a theoretical oxide basis contained about 61.3% silica, about 4% alumina, about 8.4% CaO, about 1.3% MgO, about 7.4% $B_2O_3$, about 15% $Na_2O$, about 0.1% $K_2O$, about 0.2% $Fe_2O_3$, about 0.5% SrO, about 0.1% $TiO_2$, and about 0.4% sulfur as $SO_3$. The batch employed included about 45.3% (by weight) sand, about 1.1% limestone, about 7.8% clay, about 2.8% burnt dolomite, about 23% by weight of a sodium calcium borate bearing material (ulexite) and about 20% soda ash. The borate material was ground prior to use, such that approximately 100% by weight of the material was minus 200 mesh. It contained about 21% CaO, about 27% $B_2O_3$, about 4% $Na_2O$, about 9% $SiO_2$ and 3% MgO and minor amounts of other oxides and its loss on ignition was about 31%. The particle size of the sand employed was: about 5% by weight (minus 12 and plus 30) mesh: about 55% between 30 and 100 mesh and about 40% by weight was minus 100 mesh. The soda ash was of the granular type and contained: about 11% by weight minus 12 and plus 20 mesh; about 69% by weight between 20 and 100 mesh and about 20% by weight minus 100 mesh. The particle size of the limestone was: 2% minus 8 and plus 20 mesh; about 68% between 20 and 100 mesh and about 30% minus 100 mesh. The clay was very fine and was approximately 98% to 99% by weight, minus 325 mesh. The burnt dolomite was about 55% to about 90% by weight minus 100 mesh with the balance being essentially between 20 and 100 mesh. The particle size analysis of the composite batch, as measured by a Leeds and Northrup Micro Trac particle size analyzer, showed that the batch had: a surface area of about 0.3 to about 0.4 sq. meters per cubic cm of batch; an average particle size of about 110 about 120 microns with 100% of the particles smaller than 300 microns, about 69–70% smaller than 212 microns, about 51–52% smaller than 106, about 45–46% smaller than 53 microns, about 25–26% smaller than 13 microns, and about 6–7% smaller than about 4–5 microns. In all subsequent cases the above batch was pelletized on a rotary disc pelletizer with water to produce pellets containing between about 13 to about 14% by weight water (dry basis). The tested pellets generally had diameters in the range of about $\frac{3}{8}$ of an inch to about $\frac{5}{8}$ of an inch.

Unless otherwise indicated, when reference is made to the water content of the pellet bed, or of the pellets, that means the water content of a pellet in the uppermost layer of the bed. Care was taken such that the respective beds that were formed had as uniform an upper surface, or as uniform a height, as practicable. The following represents an easy way of simulating the drying conditions, that is, drying wet agglomerates with gases that have passed through the preheater where they have given up some of their heat to preheat dry pellets in the preheater and have consequently had their dry bulb temperature substantially reduced with virtually no change in wet bulb temperature. The following procedures are employed to obtain the needed design and operating data for any installation or glass composition or agglomerate type.

EXEMPLIFICATION OF INHERENT AGGREGATE FORMING HEIGHT AND ADJUSTED INHERENT AGGREGATE FORMING HEIGHT

The following equipment was employed to determine the "inherent aggregate forming height" as well as to demonstrate and determine the various "adjusted aggregate forming heights" which correspond to various wet bulb temperatures. Essentially the equipment includes a cylindrical drying chamber having a diameter of about 20 inches and a height of about 24 inches. Along the 24 inch axial height of the drying chamber there is provided a plurality of sample ports such as, for example, at about 3 inch intervals. The top wall includes a vapor outlet duct and is either removable or has suitable port means providing access to the internal portions of the chamber so as to allow agglomerate charging. A bottom portion of the chamber is defined by a perforate, or foraminous, pellet retaining metal plate. The actual size of openings in this plate were about $\frac{1}{4}$ inch. Flanged to the bottom of the drying chamber, beneath the perforate plate, is another substantially similarly dimensioned cylindrical chamber. In this lower cylindrical chamber is provided a bed of E-type glass marbles whose function is to provide a flow straightening effect to gases entering the bottom thereof. A head space is provided above the marbles and beneath the perforate plate, with a gas bypass duct communicating with that head space. Adjacently downwardly of the perforate plate is a solid plate, traversing the transverse dimension of the equipment, whose function is to operate in the nature of a blank. The blank is manually movable outwardly and inwardly in a direction perpendicular to the axis of the test equipment. Pellets are accumulated in the upper chamber on the perforate, pellet retaining metal plate in the form of beds having different predetermined heights for successive runs. In operation, the heating medium will be provided to the lower portion of the flow straightening marble bed, the gases pass upwardly therethrough and until the psychrometry and flow is stabilized, the blank is closed and the bypass employed so as to preclude gas-pellet contact. The blank is then moved outwardly to allow the heating medium to pass through the bed and flowing, direct drying contact is then achieved, and maintained, between such drying medium and the pellets for a sufficient period of time to dry the pellets to substantially total dryness. Dryness is monitored, if desired, by removing a pellet of the upper layer of the bed and determining its moisture content. The drying medium utilized was produced by combustion of natural gas in a burner with controllable amounts of air, with the combustion products conveyed in a duct member to the marble bed. Intermediate the burner and entry into the marble bed, a pipe arrangement was provided which allowed for the introduction of controlled amounts of steam to adjust the wet bulb temperature of the heating medium. Primarily to control the dry bulb temperature of the combustion products, air was supplied to the burner by means of a variable speed centrifugal blower. In order to obtain the most meaningful information, the pellet bed should be of a substantially uniform height so as to provide for substantially uniform flow of the gases through the pellet bed and minimize short circuiting type effects. In the following, the actual superficial velocity of the heating medium through the drying chamber varied between about 200 to about 400 feet per minute. Thus, as will be appreciated, various bed heights are employed in successively different runs and heated to substantial dryness with the condition of the bed qualitatively evaluated as by inspection through the sample ports. The chart below summarizes such operation in which H refers to the approximate height of the bed, T (wb) is the approximate calculated wet bulb temperature of the drying medium and, in the column entitled "Bed Condition", S refers to the fact that the pellets were stuck in the bed as aggregates and NS refers to no substantial sticking when the respective beds were taken to substantially total dryness. The chart below was developed employing a dry bulb temperature of approximately 350° F.

| H | T(wb) | Bed Condition |
|---|---|---|
| <2 inches | 137° F. | NS |
| 2 inches | 137° F. | S |
| 3 inches | 120° F. | S |
| 3 inches | 111° F. | NS |
| 6 inches | 104° F. | S |
| 6 inches | 100° F. | NS |
| 9 inches | 80° F. | NS |
| >9 inches | 80° F. | S |

The above wet bulb temperatures approximately correspond on a calculated basis to the following equivalent levels of dilution of flue gases from a gas fired melting furnace: 137° F. about 0% dilution; 120° F. about 100% dilution; 111° F. about 200% dilution; 104° F. about 300% dilution; 100° F. approximately 400% dilution. The wet bulb temperature of 80° F. corresponds to, in affect, infinitely diluted flue gas (e.g. about 800% dilution) inasmuch as the wet bulb temperature approached that of the ambient. Percent dilutions as referred to herein are the volume ratios of ambient air used for dilution to the volume of flue gases so diluted, multiplied by a value of 100. Thus for example, a 100% dilution is effected by diluting one volume of flue gases with one volume of dilution air.

The foregoing chart indicates that the "inherent aggregate forming height" (drying to substantially total dryness with flue gases from a melter, wherein, substantially stoichiometric amounts of air and fuel are employed or drying with a gas having a wet bulb essentially the same as such flue gas) is approximately 2 inches. Thus, the height of the preconditioning beds in the preconditioning chambers may be less than about 2 inches and satisfactory operation will be obtained when pellets are totally dryed using a drying medium having a wet bulb temperature of about 130° F. to about 140° F., e.g., melter furnace flue gases which have passed through a vertical bed of dry pellets to preheat them; such flue gases need not be diluted with air but dilution will cause no difficulty using such a height. The chart also exemplifies how the inherent aggregate forming height may be adjusted; thus, it shows the various "adjusted inherent aggregate forming heights" as they correspond to various wet bulb temperatures of the drying medium (or flue gas dilution levels). For example, an adjusted inherent aggregate forming height of about 3 inches corresponds to a wet bulb temperature of about 111° F. (about 200% flue gas dilution). Consequently, the height of the static preconditioning beds can be about 3 inches when the drying medium has a wet bulb temperature of about 111° F. and the preconditioning bed will be hydrologically stabilized when totally dried; with that same height, the bed will also be hydrologically stabilized when totally dried, by using a wet bulb temperature of less than about 111° F. (greater than about 200% flue gas dilution). Using a wet bulb temperature greater than about 111° F. (less than about 200% flue gas dilution) will require a bed height less than about 3 inches. Similarly, an adjusted aggregate forming height of about 6 inches corresponds to a wet bulb temperature of about 100° F. (about 400% flue gas dilution). Consequently, the preconditioning bed, when at a height of about 6 inches (or less), will be hydrologically stabilized when substantially totally dried with a medium having a wet bulb of about 100° F., or less, (about 400% dilution or greater). Totally drying a bed having a height greater than about 6 inches, so as to form a dry hydrologically stabilized bed, will require a heating medium with a wet bulb less than about 100° F. The maximum bed height without serious aggregate formation, when the bed was substantially totally dried, was on the order of about 8-9 inches when the wet bulb temperature of the heating medium was about 80° F.; that substantially represents the use of infinitely diluted flue gases as the drying medium i.e., the virtual equivalent of heating ambient air at constant humidity to indicated dry bulb.

Obviously, the same operational characteristics exist for the embodiment wherein the pellets are to be electrically melted, that is, in that embodiment wherein the heating medium is provided by the separate combustion of a fuel and air, the pellets preheated and preconditioned therewith, and the preheated pellets or agglomerates supplied to an electric melter. The above can be implemented by, for example, selecting a desired height for the preconditioning bed in the preconditioning chambers, say about 6 inches. The amount of air used for combustion is then selected so that the combustion products will have the maximum tolerable dry bulb temperature (less than the temperature which will cause dry agglomerates to sinter) but a wet bulb temperature no greater than, and preferably slightly less than the wet bulb temperature corresponding to the adjusted imminent aggregate forming height of the bed height selected—about 100° F. for the 6 inch selection or about 111° F. for a 3 inch selection. Such combustion products are then supplied through duct 50 to the vertical bed of preheater 3 and to the respective preconditioning chambers 11, 21, 31, 41 for substantially totally drying the beds therein prior to discharge to the vertical bed of preheater 3 for further heating. Alternatively, if the separate combustion is selected such that the wet bulb temperature of the combustion products in duct 50 is greater than that corresponding to that of a selected bed height having an adjusted imminent aggregate forming height of such selected height (e.g. greater than 111° F. for a 3 inch selection or greater than 100° F. for a 6 inch selection) then these gases, after passage through the vertical bed and prior to entry into the preconditioners, may be diluted with air, as by duct 40, to a wet bulb temperature which is less than the wet bulb temperature corresponding to the adjusted imminent aggregate forming height of a bed with the selected height (e.g. less than about 111° F. for a 3 inch selection).

No dramatically different results, relative to the above table, were observed when employing dry bulb temperatures of the heating medium varying between about 200° F. to about 500° F.

The foregoing indicates the manner in which the bed of hydrologically unstable agglomerates, e.g. pellets, may be converted to a hydrologically stabilized bed of agglomerates by heating, to substantially totally dry the agglomerates of the bed, and then, without fear of massive aggregate formation, discharging the bed to a main vertical bed in a preheater for subsequent processing so as to preheat the agglomerates to a substantially elevated temperature, for example a temperature in excess of 450° C., preferably in excess of about 500° C., or even 600° C., depending on the composition employed.

PRECONDITIONING BEDS WITH A HEIGHT GREATER THAN THE ADJUSTED INHERENT AGGREGATE FORMING HEIGHT

It has been previously indicated that in accordance with this invention it is also possible to operate the preconditioning bed at a height which in excess of the inherent aggregate forming height and even in excess of the adjusted inherent aggregate forming height corresponding to the wet bulb temperature of the drying medium employed. This unique state, also representing a state wherein the bed is hydrologically stabilized (no massive aggregation in either the preconditioning bed or vertical bed), is obtained when the wet agglomerates have been heated for a sufficient period of time to remove some, but not all, of the free water content thereof. The following will exemplify the manner of determining such a state.

In FIG. 2 of the drawing, there is schematically illustrated the laboratory arrangement which may be employed to develop any characteristic operating curve for the system employed. In the drawing there is generally shown a heating and drying chamber 10, generally having the same shape as the preconditioning chambers and being a scaled down model thereof, e.g. a chamber with a 1 foot-square cross section. The chamber includes an upper chamber portion 12, which simulates the preconditioning chamber, and a lower chamber 14 to which pellets of the bed in chamber 12 are dropped. Element 16 is a suitable pellet detaining, or supporting member which is porous, or permeable to the drying medium; that is it provides the support for the bed to be preconditioned and allows the heating medium to pass therethrough with a minimal pressure drop. Additionally element 16 is movable, for example manually, inwardly into an outwardly from chamber 12. Desirably, however, element 16 will be moved inwardly and outwardly by an air operated piston and cylinder, for example one delivering a force of about 250 pounds. Additionally, the wall of chamber 12 will be provided with a wiper or scraper which functions in the nature of a doctor blade to scrape the pellets of the bed from element 16 as it moves outwardly from its inward position in the chamber 12, thereby discharging the pellets of the preconditioned bed gravitationally downwardly into lower chamber 14. Most expediently element 16 will be, and was, a scaled down substantial duplicate, or model, of the actual device contemplated for use in the preconditioners to form the preconditioning bed. In this instance element 16 was a drawer-like receptacle having a bottom formed of a plurality of parallel rods, displaced on about ¼ inch centers, and included an inner end wall, extending upwardly from the rods, sidewalls and an outer end wall with the receptacle being suitably supported for movement inwardly and outwardly of chamber 12 by the above-indicated air operated piston and cylinder. Reference may be had to the above-incorporated application, Ser. No. 031,369 and Ser. No. 095,871, for fuller particulars of the arrangement for the pellet detaining receptacle and the wiper for discharging the pellets of the bed thereon. Chamber 14 includes, at a bottom portion, a perforate metal plate 18 which functions to retain pellets discharged from chamber 12 to chamber 14 and also provides for a substantially uniform flow of heating medium through both chamber 14 and 12. Beneath perforate metal plate 18 is a slidable blank-type plate 20. At the lowest portion of chamber 10 is a flow straightening means, in the form of a bed of E-glass marbles (not shown), which are disposed beneath another perforate plate 22. Blank type slide gate 20, when closed, directs gases from the head space above plate 22 to a bypass line. Appropriate valving (not shown), is of course, provided and in this manner the gas flow, and its psychrometry, can be stabilized by passing gases through the bypass before contact with the pellets. In a manner similar to that described above, the heating medium is provided by burning a combustible fuel, for example natural gas, with controlled amounts of air. Steam is injected into the products of combustion to adjust the wet bulb temperature of the heating medium, and the dry bulb temperature is primarily controlled by employing controlled excess amounts of stoichiometric air for combustion. The drying medium exhausts from chamber 10 through a duct in the top wall. A suitable, sealed releasable access opening or door (not shown) is provided in the upper wall of chamber 10 to allow predetermined amounts of pellets to be added to chamber 12 so as to form a preconditioning bed on element 16 when the latter is in its inward position. The sidewall of upper chamber portion 12 is provided with a plurality of sample and observation ports (not shown) in the axial direction of the chamber and, closely adjacent to perforate plate 18, chamber 14 is provided with a sealed, removable door (also not shown) for withdrawing pellets from chamber 14. The fuel, air and steam are appropriately adjusted to obtain the desired psychrometry of the drying and heating medium with blank plate 20 being closed and the gases exiting through the bypass until the desired conditions are obtained and stabilized. A total heating and drying cycle is then selected, such as for example a fifteen minute cycle. Pellets are then added, with receptacle 16 being inward in chamber 12 so as to form a wet bed of pellets having a height of about 2 inches, with care being taken to have a bed of substantially uniform height. The bypass valve (not shown) is then closed and slide gate 20 opened. Operation then is allowed to take place for a predetermined interval, for example two minutes, at which time a pellet is removed from the upper surface of the bed in chamber 12, the air cylinder activated to move receptacle 16 outwardly so as to contact the bed with a wiper, push it therefrom and drop the pellets of the bed approximately one foot into chamber 14 onto plate 18. The moisture content of the withdrawn pellet is determined and the balance of the heating cycle, in this case, thirteen minutes, is continued. The characteristics of the pellets in the static bed in chamber 12 are noted at the time of discharge, especially as to their state of aggregation, if any, and their ability to be discharged from receptacle 16 to plate 18. The characteristics of the bed in chamber 14, i.e., the degree of aggregation, if any, is noted at the end of the total 15 minute cycle, i.e., after the thirteen additional minutes. The pellets are removed from chamber 14 and another run made with a 2 inch bed. This run however, will alter the time for heating in chamber 12 to 4 minutes followed by 11 minutes of heating in chamber 14 with the same procedures and observations being made. With a two inch bed, successive runs are similarly made in which heating in chamber 12, prior to discharging the bed into chamber 14, will be 6 minutes, 8 minutes, 10 minutes, 12 minutes and 14 minutes and, correspondingly, the time for heating in chamber 14 will respectively be 9, 7, 5, 3 and 1 minute. In all instances, the characteristics of the bed at discharge will be observed, a moisture content of a pellet in the top layer will be taken, and the characteristics of the pellets in bottom chamber 14 will be observed at the end of the heating cycle. This same procedure was then repeated using bed heights in chamber 12 of about 4 inches, about 6 inches, and 8–9 inches. Under some conditions it will be noted that the beds in chamber 12 convert to a large aggregate, or aggregates, whereas under other conditions, upon discharge to chamber 14, the pellets aggregated in that chamber. In all instances the pellets are substantially totally dry after the 15 minute cycle. The data is then collated and a operating curve developed.

FIG. 3 is an example of such developed operating curve. That curve was developed using pellets having a water content of about 13.6% by weight (dry basis). The heating medium approximately corresponded on a calculated basis to the use of flue gases from a melter which had been diluted about 150% as the calculated wet bulb was about 115°–116° F.; the dry bulb temperature of the heating medium entering chamber 14 was about 350° F. and its actual superficial velocity through chambers 14 and 12 was about 400 feet per minute.

Referring now to FIG. 3, it will be seen that the curve includes a line AB. That line means that the ratio ($W_f/W_i$) on a dry basis, of the water content of pellets in the upper layer of a bed with a height H in a preconditioning chamber, ($W_f$), relative to the water content of the wet pellets initially charged into that chamber, ($W_i$), be less than a prescribed value; otherwise, when the pellets are discharged from a preconditioning chamber (12, or for example 21) to another chamber, for example to a vertical bed in preheater 3 (or chamber 14) and the heating cycle continued, they will aggregate in the latter chamber when heated to total dryness. FIG. 3 shows this value of $W_f/W_i$ to be about 0.96. In the present instance, as indicated, $W_i$ generally was about 13.6% and $W_f$ was the determined water percentage of the pellets taken from the top layer at the time of discharging the bed from chamber 12. There is another consideration with regard to the operation of the preconditioning beds. That is, if the heating is done in a preconditioning chamber (12 or e.g. 21) for a time such that the amount of water removed will cause the $W_f/W_i$ ratio to be approximately to the right of curve CE, undesirable pellet sticking and aggregation will occur in the preconditioning chamber itself. The line ED generally indicates that the pellets may be substantially totally dried without serious aggregate formation in the preconditioner when the height of the preconditioning bed is less than about the adjusted inherent aggregate forming height corresponding to the wet bulb temperature of the drying medium employed. Thus, for most reliable performance under such conditions the moisture content of the upper layer of pellets in the preconditioning chamber just prior to discharging the bed by dropping it to a main vertical bed for preheating should be such that the $W_f/W_i$ ratio generally falls within the approximate area ABCED of FIG. 3. For example, when using a bed height equal to, or less than, the inherent aggregate forming height, i.e. about 2 inches or less, serious aggregate formation neither occurs in lower chamber 14 nor in the preconditioning bed of chamber 12 so long as the bed of chamber 12 be discharged into chamber 14 after heating for a sufficient period of time such that the water content ratio ($W_f/W_i$) is less than about 0.96. At a 4 inch bed height (which is greater than the adjusted inherent aggregate forming height corresponding to the wet bulb temperature of the drying medium used), the bed was hydrologically stabilized, in that no serious aggregate formation was noted in either chamber, so long as the water content ratio, when the preconditioning bed was discharged, was less than about 0.96 but greater than about 0.7. Similarly, the ranges for the 6 inch bed were between about 0.96 to about 0.85 to produce a hydrologically stabilized bed.

The dotted lines in FIG. 3 at the 2, 4, 6, and 8–9 inch bed heights, hence represent operating "tie-lines" and it will be observed that the operating range of the tie-line decreases with height. Thus, by operating in conformity with such tie lines, the pellets of the preconditioning bed can be moved to a main vertical bed prior to the point of interpellet adhesion reaching an irreversible state of unacceptable aggregate formation in the preconditioner and a point at which such formation will likewise not occur in the vertical bed of the preheater when the agglomerates are further heated to an elevated temperature.

In the above, the tie line for the 8–9 inch bed amounts to preconditioning for about 7 and one-half (7.5) minutes to about 8 minutes prior to bed discharge. The tie-line for the 6 inch bed is preconditioning heating for about 6 to about 8 minutes prior to bed discharge, and about 3 to about 8 minutes for the 4 inch tie-line. Thus, for example, consistent with the foregoing discussion, bed heights of about 4 to about 8–9 inches may be hydrologically stabilized by heating a hydrologically unstable pellet bed for about 3 to about 8 minutes prior to discharge to a vertical bed for further heating to elevated temperatures. Lower drying times will be used with higher dry bulb temperatures. Generally, the water content of pellets during drying will depend on the velocity of the drying medium, the height of the bed, the dry bulb temperature of the drying medium, the initial water content of the pellets to be dryed, the drying time, pellet diameter and the wet bulb temperature of the medium.

Substantially the same results were obtained for the 4 inch tie-line using a heating medium which on an approximate calculated basis corresponded to about 75% dilution of flue gases.

It will be most desirable, for conservative design, to design the operation of the preconditioning chambers to operate at a certain predetermined height but that the bed be discharged based upon operation on a tie-line for a height which is in excess of that predetermined height. For example, for at least initial operation, a 4 inch height can be suitably selected for the preconditioning bed but the bed, prior to discharge, be operated on the tie-line for the 6 inch height. In this way, a margin of error is provided. This margin of error can be further increased, if desired, by, in the case of using melter furnace flue gases, diluting them to a higher level or, in the case of electric melting, either diluting the gases employed or increasing the amount of air used for combustion. It is then possible to further optimize the system if desired.

Hydrologically unstable allgomerates will usually also be characterized by a non-linear strength drying curve in which, as wet, or green agglomerates having an initial water content, $W_i$, are dried and the strength thereof is measured at various times during the drying process and the water content thereof, $W_f$, also being determined at that time, the strength of the agglomerates will show a minimum value prior to their being totally dry. That is, the strength will initially decrease as the $W_f/W_i$ ratio decreases and, subsequently, the strength will increase as the $W_f/W_i$ ratio continues to decrease and goes to zero. The foregoing free water containing alkali-alkaline earth aluminoborosilicate pellet batch composition, for example, when plotting compressive strength (ordinate) against the ratio $W_f/W_i$ (abscissa) shows a decrease in strength from a ratio of one (1) to a general minimum value of about two pounds when the ratio is generally between about 0.8 to about 0.64 and then the strength increases to a value of about 70 to 90 pounds as the ratio reaches zero. With such type compositions, in order to minimize the possibility of inadequate pellet strengths complicating the desired process operation as, for example, when the pellets of the preconditioning beds are to be dropped more than a couple of feet, it will be desirable to discharge the preconditioning beds when the pellets, especially those in the upper layer of the bed, are either substantially totally dry or such that the pellet strength will be increasing during further drying in the vertical bed. Thus, desirably, the preconditioning beds will be discharged when the $W_f/W_i$ ratio is at, at least, the strength minimum. Thus, for example, the beds are suitably discharged in a hydrologically stabilized state where the $W_f/W_i$ ratio is less than about 0.6 and even more suitably, for strength considerations, when the ratio is less than about 0.3. At about 0.3 the strength is about 6 pounds and this strength goes to about 70–90 pounds as the water content ratio approaches zero. As will be apparent a balance may need to be made, on one hand, between the selected preconditioning bed heights, and the operating conditions to hydrologically stabilize such beds, and, on the other hand, the above indicated strength considerations. In those circumstances where the above strength considerations are somewhat sacrificed it will, in general, be desired to provide for a minimum dropping height of the pellets from the preconditioning bed(s) to the main vertical bed, e.g. a dropping height of around two feet, or even less, like 1 to 2 feet.

The following further exemplifies the present invention in which a gas fired melter (about 80 sq. feet) was employed to produce glass at a rate of about 3600 pounds per hour and a rotary disc pelletizer having a diameter of about 6 feet operating at about 10 RPM and inclined at an angle of about 49° was employed to produce water containing pellets. A rotary scraper was employed which revolved at about 20 RPM. In parts by weight the batch was about 1043—sand, 161—clay, 71—burnt dolomite, 526—ulexite (containing about 23% $B_2O_3$), 444—soda ash and 54—5 mole borax. The particle size of the batch, as measured by a Micro Trac size analyzer was as follows with the percentage being the weight percent smaller than the specified size: 300 microns—100%; 212 microns—63%; 106 microns—59.6%; 53 microns—44%; 27 microns—31.9%; 13 microns—22.8%; 4.7 microns—8.8%; the batch having a surface area of 0.313 square meters per square centimeter and an average particle size of about 118 microns. The batch was formed into pellets and screened to produce pellets having a size of ⅜ to ⅝ inch; the pellets had a water content of about 11–12% by weight (dry basis) and prior to preconditioning were coated with the same dry batch in a rotary drum with about 3 parts by weight of the dry batch per 100 parts by weight of the pellets.

The flue gases (after passage through a recuperator) entering the preheater had a temperature of about 1200° F. (649° C.)–1250° F. (677° C.). The preheater had a diameter (cylindrical portion) of about 7 feet. It is estimated that the flue gases were diluted about 200%–300% by leakage of ambient air into the preheater through the heat exchanger and into the preconditioners through their attachments to the preheater. Additionally a gas fired burner (using a substantial excess of stoichiometric air—about 300%) was positioned in duct 40 and regulated to produce a heated mixture having a temperature of about 1200° F.; the burner was periodically employed so that the temperature of the gases after passage through the preconditioning beds was generally in excess of about 350° F.–400° F. The temperature of the gases supplied to the preconditioners varied between about 400° or 500° F. to about 700° F. with the velocity of the gases (actual superficial) through each of four preconditioners being about 400–500 feet per minute. The heights of the preconditioning bids generally varied between about 4–6 inches with each preconditioner operating on a two minute fill—6 minute heat cycle with the area of each bid being about 2 feet×2 feet. The height of the vertical bed in the preheater was generally maintained about 10–11 feet above the wedge shaped gas distributor with the temperature of the dry pellets leaving the preheater being about 1200° F. An exhaust blower was employed having a capacity of about 5000–7000 scfm with the temperature of the gases near the suction inlet of the blower being about 300° F.–410° F. Excellent results were obtained in total operation and energy savings.

Having described the invention it will, of course, be apparent that modifications of the invention may be made which pursuant to the patent statutes and laws, do not depart from the spirit and scope thereof.

We claim:

1. In a glass manufacturing process comprising, combining glass forming batch ingredients and water into free water containing glass batch agglomerates, continuously directly contacting glass batch agglomerates in a vertical bed with flue gases from a glass melting furnace so as to preheat agglomerates, discharging said preheated agglomerates from a lower portion of said bed, charging said preheated agglomerates to said melting furnace and melting said charged agglomerates therein, the improvement wherein said free water containing glass batch agglomerates are hydrologically unstable and further comprising accumulating a predetermined amount of said hydrologically unstable agglomerates in a preconditioning chamber so as to form a preconditioning bed of a predetermined height, directing flue gases from said vertical bed into said preconditioning chamber and passing said gases through said preconditioning bed so as to heat said preconditioning bed of hydrologically unstable agglomerates for a sufficient period of time to form a hydrologically stabilized bed of agglomerates, discharging the agglomerates of said hydrologically stabilized bed and supplying them to said vertical bed.

2. The process of claim 1 wherein said preconditioning bed is a static bed.

3. The process of claim 1 wherein said hydrologically unstable agglomerates are accumulated in at least two, separate preconditioning chambers, said chambers being in a parallel flow arrangement and disposed downstream of said vertical bed.

4. The process of claim 3 wherein said flue gases are directed from said vertical bed to said chambers and exhausted therefrom in a parallel flow path.

5. The process of claim 1 wherein said height is less than the inherent aggregate forming height of said hydrologically unstable agglomerates.

6. The process of claim 1 wherein said height is greater than the inherent aggregate forming height of said hydrologically unstable agglomerates.

7. The process of claim 3 wherein said hydrologically unstable agglomerates are sequentially accumulated in said parallel flow arranged preconditioning chambers.

8. The process of claim 1 wherein the weight ratio of free water in the agglomerates of the upper layer of said preconditioning bed, at the time of discharging said hydrologically stabilized bed, relative to the free water of said agglomerates accumulated in said chamber is less than about 0.96%.

9. The process of claim 6 wherein the wet bulb temperature of the flue gases from the melting furnace is in excess of about 130° F. (54° C.) and said flue gases, prior to being directed into said preconditioning chambers, are diluted with air to decrease the web bulb temperature thereof and the height of the said preconditioning bed is in excess of the adjusted imminent aggregate forming height corresponding to the wet bulb temperature of the diluted flue gases directed into said preconditioning chamber.

10. The process of claim 9 wherein the wet bulb temperature of such diluted flue gases is between about 100° F. to about 130° F. (38° C.–54° C.) and the dry bulb temperature is less than about 500° F. (260° C.).

11. The process of claim 1 wherein said agglomerates are pellets of batch ingredients for a glass containing Na$_2$O in an amount in excess of about 5% by weight, on a theoretical oxide basis, and said height is in excess of about 2 inches (about 5 cm) and less than about 9 inches (about 23 cm).

12. The process of claim 11 wherein said pellets contain about 10 to about 15% by weight (dry basis) of free water.

13. The process of claim 12 wherein the ratio of the water content of pellets in the upper layer of said preconditioning bed when discharged relative to the water content of said pellets accumulated to initially form said bed falls approximately within area ABCED of FIG. 3.

14. The process of claim 13 wherein said glass is a soda-lime aluminoborosilicate glass.

15. The process of claim 14 wherein substantially all the soda is supplied to the batch by a sodium carbonate.

16. The process of claim 3 wherein the height of said preconditioning beds formed in said chambers is significantly less than the height of said vertical bed.

17. The process of claim 1 wherein the flow of flue gases passing through said preconditioning bed consists of passing said gases upwardly through the bed and then exhausting said gases from said chamber.

18. An energy efficient, pollution abating, glass manufacturing process comprising, forming separate beds of free-water containing hydrologically unstable glass batch agglomerates, discharging the agglomerates of said beds, after at least some heating, and supplying them into a shaft type preheating chamber having a vertical bed of agglomerates therein, releasing dry, further heated agglomerates from said vertical bed, charging said dry, further heated agglomerates to a combustion fired melting furnace, melting said agglomerates therein while conveying flue gases from said furnace to said chamber, through said vertical bed so as to further heat said agglomerates, and then from said vertical bed through said separate beds so as to heat the agglomerates therein.

19. The process of claim 18 wherein said separate beds are heated with said flue gases for a sufficient period of time to ensure that they will not form process disabling aggregates in said preheating chamber but a period of time insufficient to allow said respective, separate beds themselves to form process disabling aggregates.

20. The process of claim 19 wherein said separate beds are static beds.

21. The process of claim 20 wherein the agglomerates of said vertical bed flow gravitationally downwardly and said flue gases are conveyed through said vertical bed in a counter-current flow manner.

22. The process of claim 18 wherein said separate beds are sequentially formed.

23. The process of claim 22 wherein said separate beds are formed adjacently upwardly of said preheating chamber and flue gases from said chamber are conveyed to said beds in a parallel flow manner.

24. The process of claim 18 wherein said agglomerates are pellets.

25. The process of claim 24 wherein said pellets have a size between about ⅜ inch to about ⅝ inch.

26. The process of claim 24 wherein said pellets are heated in said vertical bed to a temperature in excess of about 500° C.

27. The process of claim 18 or 20 or 22 or 26 wherein said flue gases are diluted with air prior to being conveyed through said respective separate beds.

28. The process of claim 22 wherein on a theoretical dry, oxide basis said pellets contain about 10 to about 20% by weight of Na$_2$O.

29. The process of claim 28 wherein said Na$_2$O is supplied by at least one member selected from the group consisting of caustic and a sodium carbonate.

30. The process of claim 1 or claim 18 wherein the agglomerates are supplied by dropping said agglomerates downwardly a distance of at least about 1 foot (about 30.5 cm).

31. The process of claim 2 wherein said agglomerates are pellets and said pellets are accumulated and said hydrologically stabilized bed discharged in a cyclic manner.

32. A glass manufacturing process comprising cyclically forming separate beds of free-water containing, hydrologically unstable glass batch agglomerates, and, after at least some heating, discharging the agglomerates of said beds, supplying them into a shaft type preheating chamber having vertical bed of agglomerates therein, releasing dry, further heated agglomerates from said vertical bed, charging said dry, further heated agglomerates to a glass melter and melting said agglomerates therein, while conveying a gaseous heating medium to said chamber, through said vertical bed so as to further heat said agglomerates and then from said vertical bed through said separate beds so as to heat the agglomerates therein.

33. The process of claim 32 wherein said melting is done electrically.

34. The process of claim 33 wherein said gaseous heating medium conveyed to said chamber contain combustion products and has a wet bulb temperature in excess of about 100° F. (38° C.) and less than about 130° F. (54° C.).

35. The process of claim 32 wherein said separate beds are heated for a sufficient period of time to ensure that no massive aggregates form in either said separate beds or said vertical bed.

36. The process of claim 35 wherein said separate beds are static beds.

37. The process of claim 33 wherein said gaseous heating medium is diluted with air prior to being conveyed through said respective beds.

38. The process of claim 37 wherein said separate beds are formed adjacently upwardly of said preheating chamber and said gaseous heating medium from said chamber is conveyed to said beds in a parallel flow manner.

39. The process of claim 36 wherein said agglomerates are pellets.

40. The process of claim 39 wherein said gaseous heating medium comprises combustion products.

41. The process of claim 40 wherein said gaseous heating medium is diluted with prior to being conveyed through said respective separate beds.

42. The process of claim 41 wherein said pellets are heated in said vertical bed to a temperature in excess of about 500° C.

43. The process of claim 41 wherein on a theoretical dry, oxide basis said pellets contain about 10 to about 20% by weight of $Na_2O$.

44. The process of claim 43 wherein said $Na_2O$ is supplied by at least one member selected from the group consisting of caustic and a sodium carbonate.

45. In a glass manufacturing process comprising, combining glass forming batch ingredients and water into free water containing, glass batch agglomerates, continuously directly contacting glass batch agglomerates in a vertical bed with gaseous combustion products so as to preheat the agglomerates, discharging said preheated agglomerates from a lower portion of said bed, charging said preheated agglomerates to a melting furnace and melting said charged agglomerates therein, the improvement wherein said free water containing agglomerates are hydrologically unstable and preventing said agglomerates from forming process disabling aggregates by supplying said hydrologically unstable agglomerates to a preconditioning chamber so as to form a preconditioning bed of progressively increasing height, discontinuing the supply to said chamber and directing said gaseous combustion products from said vertical bed into said preconditioning chamber and passing said gaseous combustion products through said preconditioning bed so as to heat said preconditioning bed of hydrologically unstable agglomerates for a sufficient period of time to form a hydrologically stabilized bed of agglomerates, discharging the agglomerates to said hydrologically stabilized bed and supplying them to said vertical bed.

46. The process of claim 45 wherein said preconditioning bed is a static bed while being heated.

47. The process of claim 45 wherein said hydrologically unstable agglomerates are pellets and wherein said pellets are sequentially supplied, and the supply discontinued, to at least two preconditioning chambers.

48. The process of claim 46 wherein the height of said static bed is between about 2 to about 9 inches.

49. The process of claim 45 wherein the combustion products are diluted with air prior to passage through said preconditioning bed to decrease the wet bulb temperature thereof and the height of said bed is less than the adjusted inherent aggregate forming height corresponding to the psychrometry of the diluted combustion products.

50. The process of claim 45 and further including repeating said steps of supplying, discontinuing the supply, directing and discharging in a cyclic, continuous manner.

51. The process of claim 1 or 18 or 32 or 45 wherein the height of said discharged bed(s) is no greater than the height at which aggregates will form when said bed is totally dryed by direct contact with a gaseous heating medium comprising combustion products and having a dry bulb temperature of about 350° F. (177° C.) and a wet bulb temperature of about 80° F. (26°–27° C.), but greater than the height at which such aggregates will form when so dried with a gaseous heating medium comprising combustion products and having a dry bulb temperature of about 350° F. and a wet bulb temperature of about 137° F. (58° C.).

52. A glass manufacturing process comprising discharging a supply of free water containing, hydrologically unstable, glass batch agglomerates gravitationally downwardly, discontinuing said discharging at a predetermined interval and intercepting said gravitationally downwardly discharged supply so as to form said supply into a shallow static bed of substantially uniform height, directly heating said static bed so as to remove at least some free water from the agglomerates and convert said bed to a hydrologically stabilized bed, discharging the agglomerates of said stabilized bed downwardly unto a vertical bed, said vertical bed being maintained at a predetermined minimum height, gravitationally flowing the discharged agglomerates generally downwardly through said vertical bed, heating said vertical bed, including said generally downwardly flowing discharged agglomerates to an elevated temperature by direct contact with a gaseous heating medium passing through said vertical bed, supplying said heated flowing agglomerates after flowing through said vertical bed to a glass melting furnace and melting said agglomerates therein.

53. The process of claim 52 wherein said vertical bed is maintained by discharging agglomerates of at least one other separate stabilized bed unto said vertical bed.

54. The process of claim 52 wherein the ratio of the height of said static bed to said minimum height (times 100) is less than about 5%.

55. The process of claim 52 wherein said heating medium comprises combustion products.

56. The process of claim 52 wherein said static bed is directly heated with a heating medium comprising combustion products.

57. The process of claim 55 or 56 wherein said combustion products are flue gases from a combustion fired glass melter.

58. The process of claim 52 wherein said hydrologically unstable agglomerates during drying undergo a decrease in strength to a minimum value and then an increase in strength and wherein said static bed is heated for a sufficient period of time to remove free water such that the strength of the agglomerates have at least reached said minimum at which time said agglomerates are discharged to said vertical bed.

59. The process of claim 58 wherein the supplied free water containing agglomerates have an initial water content, $W_i$, and the agglomerates in the upper layer of said static bed have a water content, $W_f$, at any point in time during said direct heating and wherein said agglomerates are discharged to said vertical bed when the ratio $W_f/W_i$ is less than about 0.6.

60. The process of claim 52 wherein said gaseous heating medium comprises combustion products, and wherein said combustion products after passage through said vertical bed are combined with air to form a gaseous drying medium and wherein said static bed is directly heated with said gaseous drying medium.

61. The process of claim 60 wherein said air is heated air.

62. The process of claim 61 wherein said heated air is produced by combustion using an excess of the stoichiometric air needed for combustion.

63. The combustion of claim 1 wherein the wet bulb temperature of the flue gases from said melting furnace is in excess of about 130° F. (54° C.) and said flue gases, prior to being directed into said preconditioning chamber, are diluted with air to decrease the wet bulb temperature thereof and the height of said preconditioning bed is less than the adjusted imminent aggregate forming height corresponding to the wet bulb temperature of the flue gases directed into said preconditioning chamber.

64. The process of claim 63 wherein said air comprises heated air.

65. A glass manufacturing process comprising: forming a bed of free water containing hydrologically unstable glass batch agglomerates; heating said formed bed for a time sufficient to form a hydrologically stabilized bed; discharging agglomerates of said stabilized bed to a vertical bed containing generally downwardly flowing agglomerates; heating the agglomerates in said vertical bed; conveying heated pellets from said vertical bed to a combustion fired glass melter for melting; said agglomerates of said vertical bed being heated by passing flue gases from said melter directly through said vertical bed; and said heating of said formed bed being done by passing a gaseous heating medium directly through said bed, said gaseous heating medium being an admixture of flue gases, after they have passed substantially through said vertical bed, with heated or ambient air.

66. The process of claim 65 wherein the height of said formed bed is no greater than about the adjusted inherent aggregate forming height corresponding to the wet bulb temperature of said admixture and the bed is heated for a period of time to substantially totally dry said agglomerates.

67. The process of claim 65 wherein the height of said formed bed is no greater than about the adjusted inherent aggregate forming height corresponding to the wet bulb temperature of said admixture and wherein said agglomerates are heated for a period of time to partially dry said agglomerates.

68. The process of claim 67 wherein said agglomerates have a non-linear strength drying curve with a minimum strength value at a predeterminable water content and wherein said agglomerates are heated for a sufficient period of time to have a water content less than said water content.

69. The process of claim 65 wherein the height of said formed bed is greater than the adjusted inherent aggregate forming height corresponding to the wet bulb temperature of said admixture and wherein said agglomerates are heated for a period of time sufficient to partially dry said agglomerates but insufficient to substantially totally dry said agglomerates.

* * * * *

UNITED STATES PATENT AND TRADEMARK OFFICE
CERTIFICATE OF CORRECTION

PATENT NO. : 4,248,615

DATED : February 3, 1981

INVENTOR(S) : Stephen Seng, Richard K. Henry, Mark A. Propster and Charles M. Hohman It is certified that error appears in the above—identified patent and that said Letters Patent is hereby corrected as shown below:

At column 8, line 42: The word "sode" should be changed to "soda"

At column 31, line 55: The word "to" should be changed to "of"

Signed and Sealed this

Sixteenth Day of June 1981

[SEAL]

Attest:

RENE D. TEGTMEYER

Attesting Officer     Acting Commissioner of Patents and Trademarks